US011327967B2

(12) United States Patent
Papaemmanouil et al.

(10) Patent No.: US 11,327,967 B2
(45) Date of Patent: May 10, 2022

(54) SYSTEMS, METHODS, AND MEDIA FOR IMPROVING THE EFFECTIVENESS AND EFFICIENCY OF DATABASE QUERY OPTIMIZERS

(71) Applicant: BRANDEIS UNIVERSITY, Waltham, MA (US)

(72) Inventors: Olga Papaemmanouil, Waltham, MA (US); Mitch Cherniack, Boston, MA (US); Zhan Li, Foster City, CA (US)

(73) Assignee: Brandeis University, Waltham, MA (US)

( * ) Notice: Subject to any disclaimer, the term of this patent is extended or adjusted under 35 U.S.C. 154(b) by 84 days.

(21) Appl. No.: 16/617,245

(22) PCT Filed: Jun. 1, 2018

(86) PCT No.: PCT/US2018/035624
§ 371 (c)(1),
(2) Date: Nov. 26, 2019

(87) PCT Pub. No.: WO2018/223010
PCT Pub. Date: Dec. 6, 2018

(65) Prior Publication Data
US 2020/0142894 A1 May 7, 2020

Related U.S. Application Data

(60) Provisional application No. 62/513,653, filed on Jun. 1, 2017.

(51) Int. Cl.
*G06F 16/24* (2019.01)
*G06F 16/2453* (2019.01)
*G06F 16/21* (2019.01)

(52) U.S. Cl.
CPC ...... *G06F 16/24542* (2019.01); *G06F 16/217* (2019.01); *G06F 16/24549* (2019.01)

(58) Field of Classification Search
None
See application file for complete search history.

(56) References Cited

U.S. PATENT DOCUMENTS 9,262,477 B1 * 2/2016 Gu .................. G06F 16/2365
2006/0085375 A1 * 4/2006 Egan ............... G06F 16/24542
2006/0122993 A1 6/2006 Dettinger
(Continued)

OTHER PUBLICATIONS

Arnold, D.B. et al. Uniform random generation of balanced parenthesis strings. ACM Trans. Program. Lang. Syst., 2(1):122-128, Jan. 1980.

(Continued)

*Primary Examiner* — Son T Hoang
(74) *Attorney, Agent, or Firm* — Quarles & Brady LLP

(57) ABSTRACT

In some embodiments, a system is provided, comprising: memory storing instructions that, when executed, cause a processor to: submit a first database query; receive a runtime to execute the first database query using a plan selected by a query optimizer; receive runtimes to execute the first database query using a plurality of test plans; determine, based on the runtimes, a metric indicative of the effectiveness of the query optimizer; and cause the metric indicative of the effectiveness of the query optimizer to be presented to a user.

21 Claims, 9 Drawing Sheets

(56) References Cited

U.S. PATENT DOCUMENTS

| | | | | |
|---|---|---|---|---|
| 2006/0212429 | A1* | 9/2006 | Bruno | G06F 16/24542 |
| 2008/0065588 | A1* | 3/2008 | Aldrich | G06F 16/24542 |
| 2008/0140622 | A1* | 6/2008 | Bestgen | G06F 16/24542 |
| 2009/0100004 | A1* | 4/2009 | Andrei | G06F 16/24542 |
| 2009/0106219 | A1* | 4/2009 | Belknap | G06F 16/24545 |
| 2010/0030758 | A1* | 2/2010 | Belknap | G06F 16/217 707/718 |
| 2014/0095472 | A1 | 4/2014 | Lee | |
| 2016/0292167 | A1* | 10/2016 | Tran | G06F 16/24542 |

OTHER PUBLICATIONS

Atkinson, M. D., et al. "Generating binary trees at random." Information Processing Letters 41.1 (1992): 21-23.

Chaudhuri, S., et al. "Rule profiling for query optimizers and their implications" 2010 IEEE 26th International Conference on Data Engineering (ICDE 2010). IEEE, 2010.

Chaudhuri, S., et al. Exact cardinality query optimization for optimizer testing. Proceedings of the VLDB Endowment, 2(1):994-1005, Aug. 2009.

Dehaan, D. et al. "Optimal top-down join enumeration." Proceedings of the 2007 ACM SIGMOD international conference on Management of data. 2007.

Fender, P., et al. "Effective and robust pruning for top-down join enumeration algorithms." 2012 IEEE 28th International Conference on Data Engineering. IEEE, 2012.

Fraser, C, et al. "Testing cardinality estimation models in SQL Server." Proceedings of the Fifth International Workshop on Testing Database Systems. 2012.

Giakoumakis, L. et al. "Testing SQL Server's Query Optimizer: Challenges, Techniques and Experiences." IEEE Data Eng. Bull. 31.1 (2008): 36-43.

Gu, Z. et al. "Testing the accuracy of query optimizers." Proceedings of the Fifth International Workshop on Testing Database Systems. 2012.

Hall P. Using the bootstrap to estimate mean squared error and select smoothing parameter in nonparametric problems. Journal of Multivariate Analysis, 32(2):177-203, 1990.

Ilyas, I. F., et al. "Estimating compilation time of a query optimizer." Proceedings of the 2003 ACM SIGMOD international conference on Management of data. 2003.

International Searching Authority, International Search Report and Written Opinion for application PCT/US2018/035624 dated Aug. 23, 2018.

Leis L. et al. How good are query optimizers, really? Proceedings of the VLDB Endowment, 9(3):204-215, Nov. 2015.

Li, Z. et al. Optmark: A toolkit for benchmarking query optimizers. arXiv:1608.02611 [cs.DB]. 2016.

Liu, L. Adaptive query optimization. In Encyclopedia of Database Systems, p. 50. 2009.

Moerkotte G. et al. Preventing bad plans by bounding the impact of cardinality estimation errors. Proceedings of the VLDB Endowment, 2(1):982-993, Aug. 2009.

Qin, Y. et al. Towards adaptive costing of database access methods. In Proceedings of the 2007 IEEE 23rd International Conference on Data Engineering Workshop, 2007.

Reddy, N. et al. "Analyzing plan diagrams of database query optimizers." Proceedings of the 31st international conference on Very large data bases. VLDB Endowment, 2005.

Stillger, M. et al. Testing the quality of a query optimizer. IEEE Data Engineering Bulletin, 18(3):41-48, 1995.

TPS. TPC-DS Benchmark, http://www.tpc.org/tpcds/. Version dated May 21, 2017.

Waas, F. et al. "Counting, enumerating, and sampling of execution plans in a cost-based query optimizer." Proceedings of the 2000 ACM SIGMOD international conference on Management of data. 2000.

Waas, F. M., et al. "Plan space analysis: an early warning system to detect plan regressions in cost-based optimizers." Proceedings of the Fourth International Workshop on Testing Database Systems. 2011.

Waas, M. benchmarking query optimizers. Apr. 19, 2011. Internet post available at http://database-research.com/2011/04/19/benchmarking-query-optimizers/.

* cited by examiner

500

502 SUBMIT QUERY TO BE TESTED TO THE DATABASE MANAGEMENT SYSTEM

504 RECEIVE INFORMATION RELATED TO THE PLAN SELECTED BY THE QUERY OPTIMIZER

506 RECEIVE INFORMATION RELATED TO PLANS CONSIDERED BY THE OPTIMIZER

508 RECEIVE INFORMATION RELATED TO EXECUTION OF THE PLAN SELECTED BY THE OPTIMIZER

510 CAUSE THE DATABASE MANAGEMENT SYSTEM TO EXECUTE THE RANDOMLY GENERATED PLANS

512 RECEIVE INFORMATION RELATED TO EXECUTION OF THE RANDOMLY GENERATED PLANS

514 CALCULATE PERFORMANCE METRICS BASED ON INFORMATION RELATED TO EXECUTION OF THE CHOSEN PLAN, THE RANDOMLY GENERATED PLANS, AND THE PLANS CONSIDERED BY THE OPTIMIZER

FIG. 5

| System | #LP | #JO | #PP | #PJ |
|---|---|---|---|---|
| MySQL | 0.92 | 0.93 | 0.94 | 0.94 |
| PostgreSQL | 0.72 | 0.72 | 0.97 | 0.97 |
| System X | 0.81 | 0.81 | 0.71 | 0.72 |
| System Y | 0.77 | 0.75 | 0.85 | 0.85 |

FIG. 6

MySQL

PostgreSQL

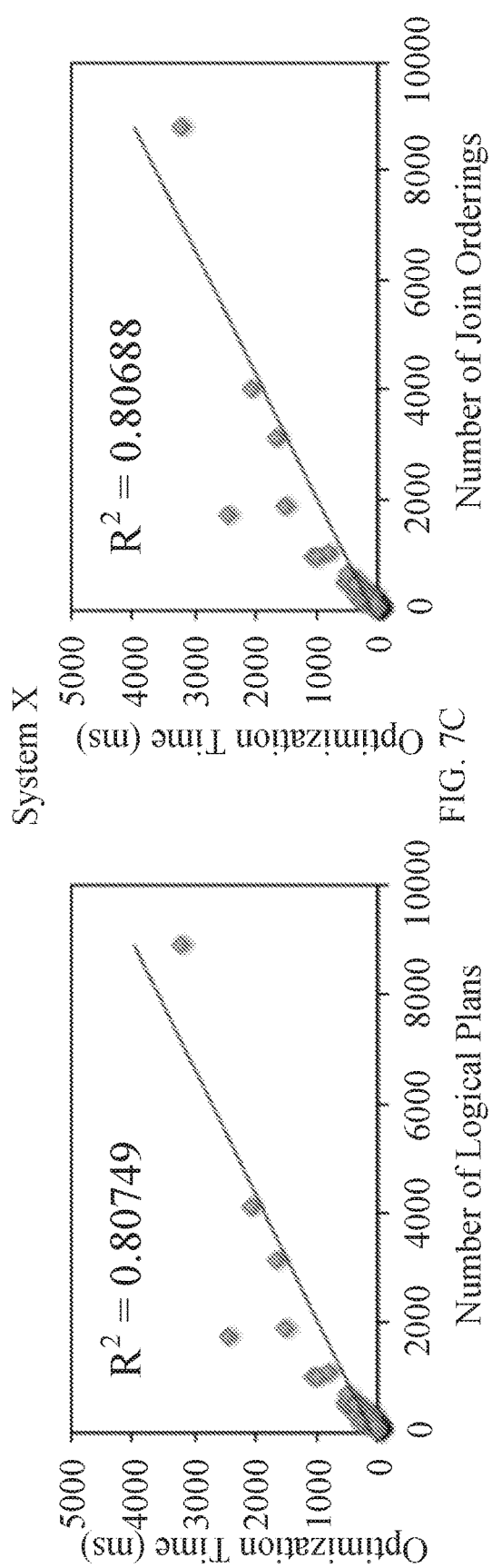
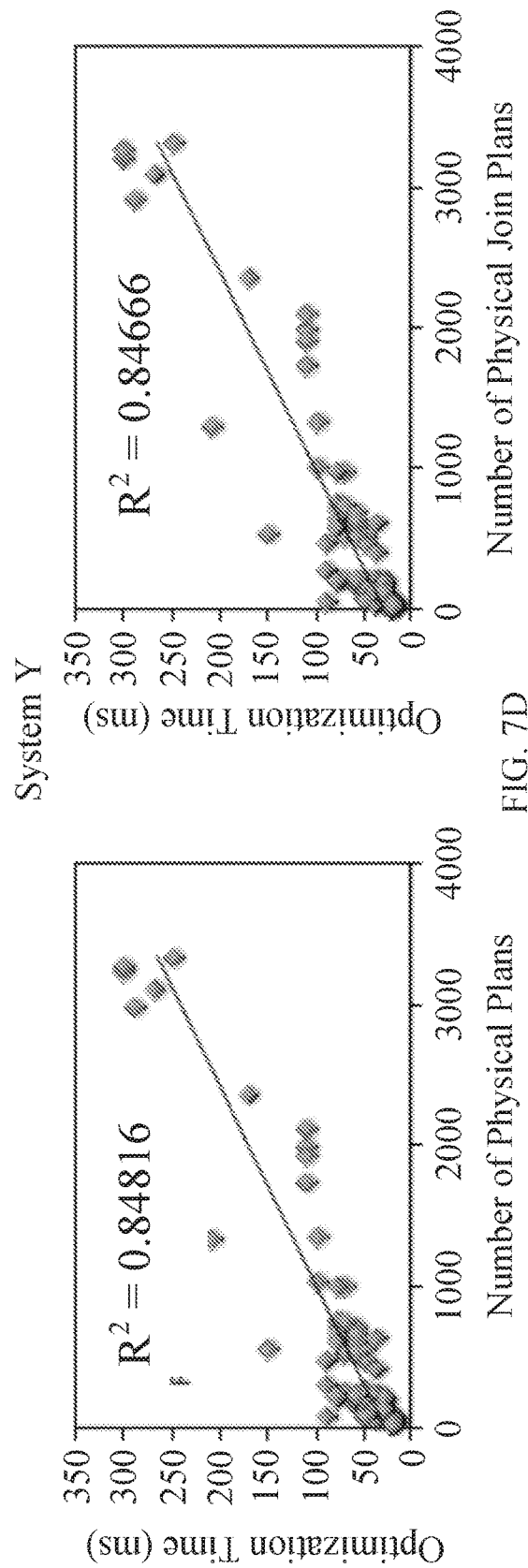
FIG. 7C
FIG. 7D

System X

| query | q6 | q7 | q13 | q17 | q18 | q19 | q24 | q25 | q26 | q27 | q29 | q40 |
|---|---|---|---|---|---|---|---|---|---|---|---|---|
| RPF | 1 | 1 | 0.88 | 0.917 | 0.854 | 1 | 1 | 1 | 0.899 | 0.989 | 0.825 | 0.979 |
| APF | 0.913 | 0.91 | 0.87 | 0.782 | 0.79 | 0.873 | 0.86 | 0.73 | 0.755 | 0.84 | 0.711 | 0.915 |

| query | q46 | q48 | q50 | q54 | q61 | q62 | q66 | q68 | q73 | q79 | q84 | q85 |
|---|---|---|---|---|---|---|---|---|---|---|---|---|
| RPF | 0.94 | 1 | 0.969 | 1 | 1 | 0.977 | 0.982 | 1 | 1 | 1 | 1 | 0.912 |
| APF | 0.85 | 0.857 | 0.83 | 0.904 | 0.82 | 0.917 | 0.85 | 0.881 | 0.83 | 0.79 | 0.77 | 0.696 |

System Y

| query | q6 | q7 | q13 | q17 | q18 | q19 | q24 | q25 | q26 | q27 | q29 | q40 |
|---|---|---|---|---|---|---|---|---|---|---|---|---|
| RPF | 1 | 0.866 | 1 | 0.812 | 0.85 | 0.871 | 1 | 0.89 | 0.858 | 0.881 | 1 | 0.895 |
| APF | 0.891 | 0.815 | 0.912 | 0.81 | 0.68 | 0.771 | 0.85 | 0.767 | 0.78 | 0.814 | 0.806 | 0.83 |

| query | q48 | q50 | q54 | q61 | q62 | q66 | q68 | q73 | q79 | q84 | q85 |
|---|---|---|---|---|---|---|---|---|---|---|---|
| RPF | 0.87 | 1 | 1 | 0.821 | 0.87 | 0.918 | 0.92 | 1 | 0.885 | 0.867 | 1 |
| APF | 0.781 | 0.924 | 0.88 | 0.75 | 0.87 | 0.87 | 0.83 | 0.87 | 0.817 | 0.78 | 0.74 |

MySQL

| query | q6 | q7 | q13 | q17 | q18 | q19 | q24 | q25 | q26 | q27 | q29 | q40 |
|---|---|---|---|---|---|---|---|---|---|---|---|---|
| RPF | 1 | 0.911 | 0.815 | 0.711 | 0.734 | 0.757 | 0.871 | 0.712 | 0.816 | 0.843 | 1 | 0.809 |
| APF | 0.85 | 0.921 | 0.78 | 0.774 | 0.71 | 0.635 | 0.81 | 0.679 | 0.72 | 0.733 | 0.77 | 0.731 |

| query | q46 | q48 | q50 | q54 | q61 | q62 | q66 | q68 | q73 | q79 | q84 | q85 |
|---|---|---|---|---|---|---|---|---|---|---|---|---|
| RPF | 0.864 | 0.91 | 1 | 0.81 | 1 | 0.85 | 1 | 0.856 | 0.91 | 0.88 | 1 | 0.751 |
| APF | 0.714 | 0.78 | 0.812 | 0.78 | 0.842 | 0.76 | 0.791 | 0.765 | 0.82 | 0.754 | 0.79 | 0.781 |

FIG. 8

| System | Logical Plans | Join Orderings | Physical Plans | Physical Join Plans |
|---|---|---|---|---|
| MySQL | N/A | N/A | 48 | 40 |
| PostgreSQL | N/A | N/A | 810 | 778 |
| System X | 146 | 123 | N/A | N/A |
| System Y | N/A | N/A | 540 | 514 |

SYSTEMS, METHODS, AND MEDIA FOR IMPROVING THE EFFECTIVENESS AND EFFICIENCY OF DATABASE QUERY OPTIMIZERS

CROSS-REFERENCE TO RELATED APPLICATIONS

This application represents the U.S. National Stage of International Application No. PCT/US2018/035624, filed Jun. 1, 2018, which is based on, claims the benefit of, and claims priority to U.S. Provisional Application No. 62/513,653, filed Jun. 1, 2017, which is hereby incorporated herein by reference in its entirety for all purposes.

STATEMENT REGARDING FEDERALLY SPONSORED RESEARCH

This invention was made with government support under NSF 1217952 awarded by National Science Foundation. The government has certain rights in the invention.

BACKGROUND

In general, query optimizers are among the most complex components of a database management system. For example, when implementing a query optimizer, decisions must be made about whether to implement a top-down or bottom-up system, how (or if) the query optimizer constrains the search space of possible plans, whether or not plans are modified dynamically, etc. Despite a wide variety of approaches to query optimization, assessment of the query optimizer's quality is problematic with current benchmarking tools. Existing database management system performance assessment approaches (e.g., the TPC benchmarks) focus solely on the execution time of the plan chosen by the optimizer, a metric that, in practice, is more indicative of the capabilities of the systems query execution engine than the quality of the plan that was selected by the query optimizer. Accordingly, these benchmarks conflate query optimization and query execution, producing an end-to-end assessment of the database management system. Thus, current approaches fail to provide the type of information that is useful for evaluating the quality of the optimization process itself, independent of the underlying execution engine.

Accordingly, systems, methods, and media for increasing the effectiveness and efficiency of database query optimizers are desirable.

SUMMARY

In accordance with some embodiments of the disclosed subject matter, systems, methods, and media for increasing the effectiveness and efficiency of database query optimizers are provided.

In accordance with some embodiments of the disclosed subject matter, a system for improving the effectiveness of a query optimizer of a database management system is provided, the system comprising: at least one hardware processor; and memory storing instructions that, when executed, cause the at least one hardware processor to: submit a first database query to the database management system; receive information indicative of an amount of time taken by the database management system to execute the first database query using a plan selected by the query optimizer; cause the database management system to execute each of a plurality of test plans that the database management system is capable of using to execute the first database query; receive information indicative of an amount of time taken by the database management system to execute the first database query using each of the plurality of test plans; determine, based on the amount of time taken to execute the first database query using the plan selected by the query optimizer and the amount of time taken to execute the first database query using each test plan, a metric indicative of the effectiveness of the query optimizer; and cause the metric indicative of the effectiveness of the query optimizer to be presented to a user.

In some embodiments, the memory stores a plurality of database queries, including the first database query, and the instructions further cause the at least one hardware processor to: submit each of the plurality of database queries to the database management system; receive, for each of the plurality of database queries, information indicative of an amount of time taken by the database management system to execute the database query using a plan selected by the query optimizer; cause, for each of the plurality of database queries, the database management system to execute each of a plurality of test plans that the database management system is capable of using to execute the database query; receive, for each of the plurality of database queries, information indicative of an amount of time taken by the database management system to execute the database query using each of the plurality of test plans associated with the database query; determine, for each of the plurality of database queries, a proportion of the test plans associated with execution times longer than the amount of time taken to execute the database query using the plan selected by the query optimizer; and calculate the metric based on the proportion of the test plans associated with execution times longer than the amount of time taken to execute the database query using the plan selected by the query optimizer associated with each of the plurality of database queries.

In some embodiments, the metric is based on the number of database queries of the plurality of database queries for which the plan selected by the query optimizer is associated with a longer execution time than each of the test plans.

In some embodiments, the instructions further cause the at least one hardware processor to: generate n test plans that each cause the database management system to execute the first database query, wherein each of the plurality of test plans is one of the n test plans; determine that n is not large enough to produce a reliable estimate of the metric based on the value of n and a proportion of the plurality of test plans associated with execution times longer than the amount of time taken to execute the first database query using the plan selected by the query optimizer; calculate a number of test plans n' to generate to reliably estimate the metric, wherein n'>n; and generate additional test plans that each cause the database management system to execute the first database query until n' test plans have been generated.

In some embodiments, the instructions further cause the at least one hardware processor to: determine that at least one of the following conditions does not hold: $n \times \rho \geq 5$, and $n \times (1-\rho) \geq 5$, where $\rho$ is the proportion of the plurality of test plans associated with execution times longer than the amount of time taken to execute the first database query using the plan selected by the query optimizer; and in response to determining that at least one of the conditions does not hold, determine that n is not large enough to produce a reliable estimate of the metric.

In some embodiments, the instructions further cause the at least one hardware processor to: identify a plurality of tables associated with the first database query; randomly select a join order for the plurality of tables; and generate a first test plan of the plurality of test plans based on the join order.

In some embodiments, the instructions further cause the at least one hardware processor to: identify a first test plan of the plurality of test plans that caused the database management system to execute the query in the least amount of time; in response to identifying the first test plan, compare the amount of time taken to execute the plan selected by the query optimizer to the amount of time taken to execute the first test plan; and calculate, based on the comparison of the amount of time taken to execute the plan selected by the query optimizer to the amount of time taken to execute the first test plan, a second metric indicative of the effectiveness of the query optimizer.

In some embodiments, the instructions further cause the at least one hardware processor to: request, from an application program interface (API) associated with the database management system, the information indicative of an amount of time taken by the database management system to execute the first database query using a plan selected by the query optimizer; and receive, from the API, the information indicative of an amount of time taken by the database management system to execute the first database query using a plan selected by the query optimizer.

In some embodiments, the instructions further cause the at least one hardware processor to request, from the API, indicative of an amount of time taken by the database management system to execute the first database query using each of the plurality of test plans.

In some embodiments, the instructions further cause the at least one hardware processor to: receive, in response to a request submitted to the API, syntax to cause the database management system to execute the first test plan; and cause the database management system to execute the first test plan using the syntax received from the API.

In accordance with some embodiments of the disclosed subject matter, a method for improving the effectiveness of a query optimizer of a database management system is provided, the method comprising: submitting a first database query to the database management system; receiving information indicative of an amount of time taken by the database management system to execute the first database query using a plan selected by the query optimizer; causing the database management system to execute each of a plurality of test plans that the database management system is capable of using to execute the first database query; receiving information indicative of an amount of time taken by the database management system to execute the first database query using each of the plurality of test plans; determining, based on the amount of time taken to execute the first database query using the plan selected by the query optimizer and the amount of time taken to execute the first database query using each test plan, a metric indicative of the effectiveness of the query optimizer; and causing the metric indicative of the effectiveness of the query optimizer to be presented to a user.

In accordance with some embodiments of the disclosed subject matter, a non-transitory computer readable medium containing computer executable instructions that, when executed by a processor, cause the processor to perform a method for improving the effectiveness of a query optimizer of a database management system is provided, the method comprising: submitting a first database query to the database management system; receiving information indicative of an amount of time taken by the database management system to execute the first database query using a plan selected by the query optimizer; causing the database management system to execute each of a plurality of test plans that the database management system is capable of using to execute the first database query; receiving information indicative of an amount of time taken by the database management system to execute the first database query using each of the plurality of test plans; determining, based on the amount of time taken to execute the first database query using the plan selected by the query optimizer and the amount of time taken to execute the first database query using each test plan, a metric indicative of the effectiveness of the query optimizer; and causing the metric indicative of the effectiveness of the query optimizer to be presented to a user.

In some embodiments, the method further comprises: submitting each of a plurality of database queries to the database management system; receiving, for each of the plurality of database queries, information indicative of an amount of time taken by the database management system to execute the database query using a plan selected by the query optimizer; causing, for each of the plurality of database queries, the database management system to execute each of a plurality of test plans that the database management system is capable of using to execute the database query; receiving, for each of the plurality of database queries, information indicative of an amount of time taken by the database management system to execute the database query using each of the plurality of test plans associated with the database query; and determining, for each of the plurality of database queries, a proportion of the test plans associated with execution times longer than the amount of time taken to execute the database query using the plan selected by the query optimizer; and calculating the metric based on the proportion of the test plans associated with execution times longer than the amount of time taken to execute the database query using the plan selected by the query optimizer associated with each of the plurality of database queries.

In some embodiments, the metric is based on the number of database queries of the plurality of database queries for which the plan selected by the query optimizer is associated with a longer execution time than each of the test plans.

In some embodiments, the method further comprises: generating n test plans that each cause the database management system to execute the first database query, wherein each of the plurality of test plans is one of the n test plans; determining that n is not large enough to produce a reliable estimate of the metric based on the value of n and a proportion of the plurality of test plans associated with execution times longer than the amount of time taken to execute the first database query using the plan selected by the query optimizer; calculating a number of test plans n' to generate to reliably estimate the metric, wherein n'>n; and generating additional test plans that each cause the database management system to execute the first database query until n' test plans have been generated.

In some embodiments, the method further comprises: determining that at least one of the following conditions does not hold: n×ρ≥5, and n×(1−ρ)≥5, where ρ is the proportion of the plurality of test plans associated with execution times longer than the amount of time taken to execute the first database query using the plan selected by the query optimizer; and in response to determining that at least one of the conditions does not hold, determining that n is not large enough to produce a reliable estimate of the metric.

In some embodiments, the method further comprises: identifying a plurality of tables associated with the first database query; randomly selecting a join order for the plurality of tables; and generating a first test plan of the plurality of test plans based on the join order.

In some embodiments, the method further comprises: identifying a first test plan of the plurality of test plans that caused the database management system to execute the query in the least amount of time; in response to identifying the first test plan, comparing the amount of time taken to execute the plan selected by the query optimizer to the amount of time taken to execute the first test plan; and calculating, based on the comparison of the amount of time taken to execute the plan selected by the query optimizer to the amount of time taken to execute the first test plan, a second metric indicative of the effectiveness of the query optimizer.

In some embodiments, the method further comprises: request, from an application program interface (API) associated with the database management system, the information indicative of an amount of time taken by the database management system to execute the first database query using a plan selected by the query optimizer; and receive, from the API, the information indicative of an amount of time taken by the database management system to execute the first database query using a plan selected by the query optimizer.

In some embodiments, the method further comprises requesting, from the API, indicative of an amount of time taken by the database management system to execute the first database query using each of the plurality of test plans.

In some embodiments, the method further comprises: receiving, in response to a request submitted to the API, syntax to cause the database management system to execute the first test plan; and causing the database management system to execute the first test plan using the syntax received from the API.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 5 shows an example of a process for evaluating a query optimizer of a database management system in accordance with some embodiments of the disclosed subject matter.

FIG. 6 shows an example of the correlation factor of various metrics with the optimization time for four different database management systems in accordance with some embodiments of the disclosed subject matter.

FIGS. 7A to 7D show examples of optimization times compared to the number of plans considered for various database management systems in accordance with some embodiments of the disclosed subject matter.

FIG. 8 shows examples of relative performance factor and absolute performance factor for various queries from the TPC-DS benchmark set for three database management systems in accordance with some embodiments of the disclosed subject matter.

DETAILED DESCRIPTION

Figure 1:
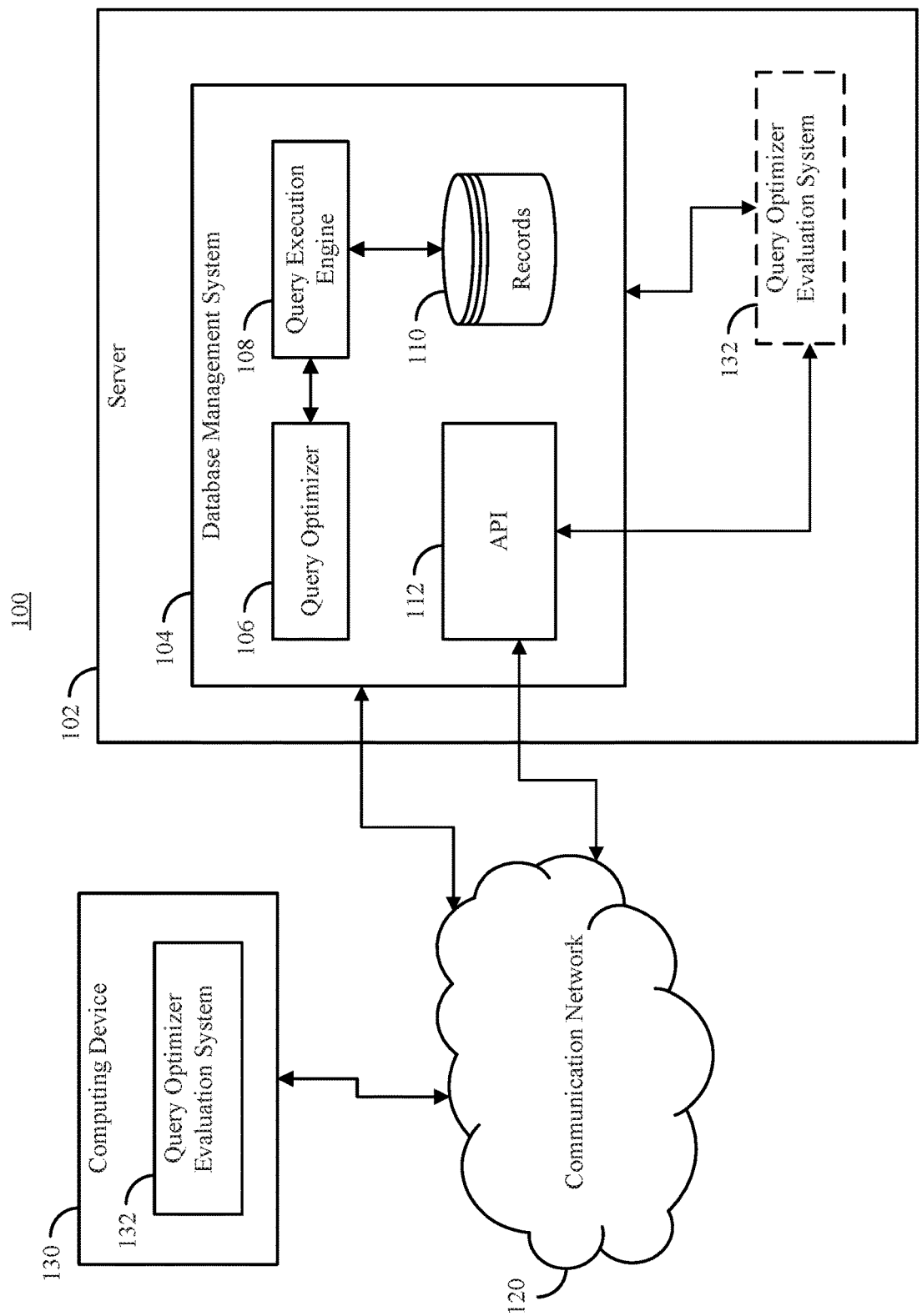
FIG. 1 shows an example of a system for evaluating the effectiveness and efficiency of a database query optimizer in accordance with some embodiments of the disclosed subject matter.

In accordance with various embodiments, mechanisms (which can, for example, include systems, methods, and media) for measuring the effectiveness and efficiency of database query optimizers are provided.

In some embodiments, the mechanisms described herein can be used to improve the effectiveness and/or efficiency of query optimizers in database management systems independent of the performance of the rest of the database management system. The mechanisms described herein can calculate metrics that shed light on the quality of the query optimizer, facilitating improvements to the effectiveness and/or efficiency of the query optimizer by allowing a developer to determine which changes made to the optimizer increase the effectiveness and/or efficiency. For example, a query optimizer running on a database management system that supports only certain query operations (e.g., only nested-loop-joins as in MySQL) should not be penalized for not discovering plans with alternative operations (e.g., hash joins), even though, all else being equal, the later plans might be executed more efficiently by a different execution engine. Instead, the mechanisms described herein can be used to evaluate the query optimizer based on its ability to discover efficient plans within its available plan search space.

In some embodiments, the mechanisms described herein can be used to evaluate metrics related to both the effectiveness and the efficiency measures of the query optimizer. The effectiveness of a query optimizer can indicate the quality of plans that it selects, while the efficiency of the query optimizer can indicate how long it takes to select the plan. While these two types of metrics can be helpful individually, the combination of the metrics is generally more useful in evaluating whether a change to a query optimizer has improved the overall quality of the optimizer, rather than improving the quality of the plans at the expense of a vast decrease in efficiency, or vice versa.

To measure effectiveness, the mechanisms described herein can calculate two complementary metrics that are indicative of the quality of the plan selected by the query optimizer. The relative performance factor indicates the proportion of the candidate plans that are worse than the selected plan, (e.g., answering the question "How does the chosen plan of a given query compare with all candidate plans?"), while the absolute performance factor indicates how close the selected plan is to the optimal plan that could have been selected (e.g., answering the question "What is the performance difference between the optimizer's selected plan and the optimal plan for a given query?"). Note that these metrics are complementary, as a query optimizer with relative plan performance factor of 0.99 (i.e., the selected plan is better than 99% of plans in the search space) may appear to be a very effective plan, but whether the absolute performance factor is 0.99 or 0.20 (i.e., whether the chosen plan is 1% or 80% worse than the optimal plan) can also be weighted into an evaluation of the optimizer's effectiveness.

In some embodiments, the mechanisms described herein can generate a set of random plans that can be used as a representative sample to evaluate a plan selected by a query optimizer being evaluated against all possible plans that could have been used to execute a particular query to a precision that can be set by a user (e.g., a developer).

In some embodiments, the mechanisms described herein can be used to evaluate the relative performance of query optimizers for different database management platforms, as the effectiveness of each query optimizer can be evaluated relative to the optimal plan that could be chosen by that query optimizer. Additionally, when assessing the efficiency of a query optimizer, the mechanisms described herein can calculate metrics that are relatively comparable across different platforms, and that do not rely on absolute optimization times, but instead are metrics that correlate well with optimization time regardless of the underlying computing platform used to execute the database management system.

Turning to FIG. 1, an example 100 of a system for evaluating the effectiveness and efficiency of a database query optimizer is shown in accordance with some embodiments of the disclosed subject matter. As shown in FIG. 1, a server 102 can execute one or more applications to provide a database management system 104. In some embodiments, database management system 104 can include a query optimizer 106 that can generate a plan for executing a received query, and an execution engine 108 that can use the plan generated by the query optimizer to search records 110 stored in one or more databases maintained by database management system 104, and return information requested in the query. In some embodiments, a query can be received by server 102 over a communication network 120. In some embodiments, the query can be received from any suitable computing device, such as computing device 130. Additionally or alternatively, the query can be received via a user interface presented by server 102. In some embodiments, the query submitted to the database management system 104 can be in any suitable format, such as structured query language (SQL). In some embodiments, communication network 120 can be any suitable communication network or combination of communication networks. For example, communication network 120 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 120 can be a local area network, a wide area network, a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc. In some embodiments, server 102 and/or computing device 130 can be any implemented using any suitable computing device or combination of devices, such as a desktop computer, a laptop computer, a smartphone, a tablet computer, a wearable computer, a server computer, a virtual machine being executed by a physical computing device, etc.

In some embodiments, query optimizer 106 can generate one or more plans for executing a received query, and can select a particular plan to be used to execute the query. The selected plan can be passed to execution engine 108 to carry out the query of database records 110 based on the selected plan. In some embodiments, a query can reference any suitable number of tables in any suitable combination. For example, a particular query can be for records from five tables in database records 110 that include a common value in a column corresponding to the same types of values. In some embodiments, query optimizer 106 can consider the order in which to join the tables referenced by the query, and/or which particular join algorithm(s) to use to join the tables. Additionally, in some embodiments, query optimizer 106 can determine whether to use an index (if one is available) to find information in a particular table or whether to scan the table for the information.

In some embodiments, computing device 130 (or server 102) can execute a query optimizer evaluation system 132 to evaluate the effectiveness and/or efficiency of query optimizer 106. As described below, evaluation system 132 can communicate with one or more application program interfaces (APIs) 112 associated with database management system 104 to receive, for example, information regarding which (or how many) plans were considered by query optimizer 106, information that can be used by evaluation system 132 to cause database management system 104 to execute a particular plan, information regarding the time taken to execute the plan selected by query optimizer 106 and plans generated by evaluation system 132.

In some embodiments, evaluation system 132 can evaluate the effectiveness of a database management system query optimizer, such as query optimizer 106, by evaluating the quality of the plans it generates. In order to effectively evaluate the query optimizer, rather than the combination of the query optimizer and the execution engine, the performance of the different components can be decoupled to evaluate the plan chosen by the query optimizer relative to other plans that the query optimizer could have chosen. Accordingly, the performance of the query optimizer can be evaluated based on the plans it can consider, without penalizing the query optimizer for not considering query operations (e.g., join algorithms, access methods, etc.) that are not supported by the execution engine of the database management system.

In some embodiments, API 112 can include one or more APIs that can communicate with computing device 130 (and/or evaluation system 132 as implemented by server 102) to convey information about the operation of database management system 104 that is otherwise not made available by database management system 104. For example, API 112 can execute one or more functions that return information related to the operation of query execution engine 108, such as which join operations are supported. As another example, API 112 can execute one or more functions that return information related to how to structure a query submitted to database management system 104 to force query optimizer 106 to select a particular plan for executing the query. As yet another example, API 112 can execute one or more functions that return information related to whether a particular plan was considered by query optimizer 106 in selecting a plan for a particular query.

In some embodiments, decoupling evaluation of the query optimizer from evaluation of the query execution engine can facilitate comparisons of query optimizers across different platforms that may enforce different rules on the plans that the query optimizer can select from. For example, the MySQL™ database management system (available from Oracle™) has a query execution engine that only permits nested-loop joins. Accordingly, in such an example, for join-heavy queries, an evaluation of the database management system as a whole would show that MySQL performs relatively poorly compared to other database management systems that support other join operations, such as sort-merge joins and hash joins. However, this may not be a fair comparison, as such a query optimizer should be considered effective if it consistently identifies the best nested-loop join plan for a given query, even though the MySQL query engine may be less effective (based on total execution time) for such a query than those that can perform other types of joins.

In some embodiments, evaluation system 132 can evaluate a particular query optimizer against the relative optimal plan corresponding to a given query in a given database management system. In some embodiments, the relative optimal plan can be the best plan the database management system can run for a particular query, which might be different across different database management systems.

In some embodiments, evaluation system 132 can calculate various effectiveness-related metrics that can be used to compare the plans that the query optimizer (e.g., query optimizer 106) selects for a particular query q in a given set of queries Q to be tested, with plans the query optimizer could have chosen. In some embodiments, evaluation system 132 can calculate a metric that is sometimes referred to herein as the Relative Performance Factor (RPF) of the query optimizer. For any query q∈Q and a query optimizer $O_D$ of a database management system DB, the Relative Performance Factor (RPF) of $O_D$ relative to q, RPF($O_D$,q), is indicative of the proportion of plans in the search space that are worse than the optimizer-chosen plan. In some embodiments, the RPF can be represented as:

$$RPF(O_D, q) = \frac{|\{p \mid p \in P_D(q), r(DB, p) \geq r(DB, O_D(q))\}|}{|P_D(q)|}, \quad (1)$$

where $O_D(q)$ is the plan that query optimizer $O_D$ generates for query q, $P_D(q)$ is a set of plans that could be executed by the query execution engine of database management system DB, r(DB, p) is the measured runtime of plan p included in the set of plans $P_D(q)$ over DB and r(DB, $O_D(q)$) is the runtime of the plan $O_D$ generates for the query q over DB. RPF as defined in EQ. 1 can have a value from 0 to 1, where a value of 1 indicates that the query optimizer $O_D$ being evaluated selected the optimal plan for the query q, and values less than 1 indicating that the query optimizer $O_D$ selected a less than optimal plan, with the distance from 1 indicating the degree to which the selected plan was sub-optimal.

In some embodiments, the set of plans $P_D(q)$ to which evaluation system 132 compares the plan $O_D(q)$ selected by query optimizer $O_D$ can include all possible plans that effectuate the query q that the query execution engine can execute. However, as the number of tables being accessed by a query increases, the number of possible plans quickly increases beyond what is feasible to evaluate in practice. Accordingly, evaluation system 132 can instead compare the selected plan $O_D(q)$ against a set of plans that is representative of the plans which the query optimizer $O_D$ could have selected. Additionally, the execution times of a query plan (e.g., r(DB, p)) can vary due to numerous environmental conditions (e.g., database management system/operating system buffers, concurrent queries, the underlying physical computing platform, etc.) and evaluation system 132 and/or the database management system DB being evaluated can be controlled to hold these factors constant (e.g., by executing the queries in isolation and using a cold cache each time). In some embodiments, the query optimizer can be evaluated under different conditions to determine the extent to which the query optimizer's performance varies based on environmental conditions.

In some embodiments, evaluation system 132 can calculate a metric that is sometimes referred to herein as the Absolute Performance Factor (APF) of the query optimizer. For any query q∈Q and optimizer $O_D$ of the database management system DB, the APF of $O_D$ relative to q, APF($O_D$,q), is indicative of the difference of the execution time between the optimizer-chosen plan and the relative optimal plan of q that can be executed by the query execution engine of DB. In some embodiments, the APF can be represented as:

$$APF(O_D, q) = \frac{r(DB, p_{opt})}{r(DB, O_D(q))}, \quad (2)$$

where $O_D(q)$ is the plan that query optimizer $O_D$ selects for the query q, $p_{opt}$ is the optimal plan for executing the query q in the database management system DB, r(DB, $O_D(q)$) is the runtime of the plan $O_D$ generates for q over DB, and r(DB, $p_{opt}$) is the runtime of the relative optimal plan over DB. APF as defined in EQ. 2 can have a maximum value of 1, indicating that query optimizer $O_D$ selected the relative optimal plan for query q (i.e., the plan with the shortest execution time), and the distance from 1 indicating the magnitude of the difference in execution time between the selected plan $O_D(q)$ and the relative optimal plan.

In some embodiments, evaluation system 132 can calculate a metric that is sometimes referred to herein as the Optimality Frequency (OF) of the query optimizer. In some embodiments, the Optimality Frequency of $O_D$, OF($O_D$, Q), can be defined as the percentage of queries in the query set Q which are tested for which $O_D$ chooses the relative optimal plan.

In some embodiments, evaluation system 132 can calculate the three metrics described above, which can characterize various aspects of the query optimizer being evaluated. For example, the metrics can provide an indication of the quality of the optimizer chosen plan, the quality of the cost model used by the query optimizer, and the quality of the plan enumeration strategy of a given query optimizer. In a more particular example, with respect to the quality of the chosen plan, the relative performance factor is indicative of how the selected plan compares with the other plans that were tested by evaluation system 132, while the absolute performance factor is indicative of the performance difference between the selected plan and the optimal plan. In such an example, if the selected plan is better than three quarters of the plans tested by evaluation system 132, but the difference in performance is minimal, this may indicate that the query optimizer does a relatively good job of selecting a well performing plan, even if it does not select the optimal plan.

In some embodiments, evaluation system 132 can identify and/or evaluate the plans that were better than the selected plan. In some such embodiments, such an evaluation can be used to indicate the quality of the cost model, and the quality of the plan enumeration strategy used by the query optimizer. For example, the quality of the cost model can be evaluated by determining how many of the plans that are better than the optimizer-chosen plan were considered by the query optimizer. In such an example, evaluation system 132 can determine that the query optimizer did not choose the better plans because of an inaccurate cost model under the conditions that were tested.

In some embodiments, evaluation system 132 can identify and/or evaluate the quality of the plan enumeration based on the number of plans that are better than the optimizer-chosen plan that were not considered by the query optimizer in selecting the selected plan. For example, evaluation system 132 can identify the plans that performed better than the selected plan that were not considered by the query optimizer. In such an example, these plans can indicate that quality of the plan enumeration techniques used by the query optimizer by identifying plans that performed better than the selected plan and were not even considered by the query optimizer.

While the metrics described above would be most useful if evaluation system 132 were to identify and execute all possible plans that the query optimizer could choose for a given query q, this would be prohibitively time consuming and resource intensive for many queries, especially as the queries grow more complex (e.g., as the number of tables referenced by the query grows). In some embodiments, evaluation system 132 can generate a set of candidate plans for a given query q by sampling from the possible plans that the query execution engine could have selected to carry out the query q. In such embodiments, evaluation system 132 can assess the quality of the plan selected by the query optimizer relative to the plans that the query execution engine is capable of executing independently of whether the query optimizer considers them or not. As described below in connection with FIG. 3, in order to reliably estimate the relative and absolute performance factor of a query q without having any prior knowledge of the performance distribution of the candidate plans that can be used to carry out the query q (e.g., how good or bad the plans are with respect to their execution time), evaluation system 132 can select sample plans that are expected to have a normal distribution of execution times by selecting plans randomly.

In some embodiments, evaluation system 132 can interact with any suitable database management system or systems that support communication over various standards. For example, in some embodiments, evaluation system 132 can communicate with the database management system (e.g., database management system 104) using the Java Database Connectivity (JDBC) API. As another example, evaluation system 132 can cause the database management system to execute plans that were generated for comparison to a plan selected by the query optimizer for a query being tested. In such an example, any suitable technique for causing the database management system to execute a particular plan can be used, such as query hints or query directives that evaluation system 132 can use to specify, for example, the types of joins that the query execution engine is to perform, and the order in which the joins are to be performed. As yet another example, evaluation system 132 can communicate with the database management system to receive information related to the plans that were considered by the query optimizer, as described below in connection with FIG. 4.

In some embodiments, API 112 can be specific to a particular database management system, as different database management systems may use different syntax for query hints, may make different information related to the function of the query optimizer available, etc. In some embodiments, API 112 can implement different functions that facilitate execution of evaluation system 132. For example, in some embodiments, API 112 can implement a function to return information related to the physical join operators that the database management system supports. As another example, API 112 can implement a function to return syntax for causing the query optimizer (e.g., query optimizer 106) to use a particular index (e.g., via a query hint). As yet another example, API 112 can implement a function to return syntax for causing the query optimizer (e.g., query optimizer 106) to use a particular physical join technique to join two tables. As still another example, API 112 can implement a function to return whether a particular plan was considered by the query optimizer when selecting a particular plan for a particular query. In a more particular example, API 112 can implement API functions with the following signatures:

1. Set {String} joinTypes( ), which can return a list of physical join methods the database management system supports in the syntax of join hints.
2. String indexHint(String t, String ind), which can, given a table name "t" and an applicable index for the table "ind", return the hint syntax for forcing an index scan on table t using the index ind.
3. String joinHint(String t1,String al1, String idx1, String t2, String al2, String idx2, String join, String clause), which can, given the name, alias and the indexes of two joining tables, return the hint syntax to force a two-way join using the specific indexes on each table. Some of the parameters, such as the alias and index parameters can be optional. In some embodiments, the above API function can also support nested queries. For example, table parameters "t1" and "t2" can be a base table, or a sub-query, where if the table parameter is a sub-query the alias parameter can be used as a reference for that query. Additionally, in some embodiments, index parameters "ind1" and "ind2" can be the output of indexHint( ) (e.g., this can use the syntax for causing the query optimizer to use a particular index). In some embodiments, parameter join can be the output of joinTypes( ) (e.g., this can use the syntax for causing the query optimizer to use a particular physical join for the two tables given in t1 and t2). In some embodiments, the parameter clause can be a string representation of the join conditions to be used.
4. Boolean isCostedPlan (Query q, Plan p), can return an indication of whether a particular plan p is considered by the optimizer when optimizing query q.

Additionally, in some embodiments, evaluation system 132 can use the JDBC function getindexInfo( ) to request information related to which indexes exist on which tables and over which attributes.

In some embodiments, API 112 can implement one or more additional functions that return information related to the plans considered by the query optimizer while selecting the particular plan that was executed by the query execution engine. As different database management systems may expose different information related to which plans were considered by the query optimizer, API 112 can implement different functions that can work for different database management systems, or can implement only those functions that work for a particular database management system with which API 112 is associated. For example, System Y (e.g., a database management system such as the Oracle Database® database management system available from Oracle Corp. headquartered in Redwood City, Calif.) may log all the physical plans considered, while System X (e.g., a database management system such as Microsoft SQL® database management system available from Microsoft Corp. headquartered in Redmond, Wash.) may only expose a compact representation of the search space of optimization plans which allows extraction of only the logical plans considered. In a further example, System X may prune resource intensive physical plans and only expose information from the plans that the query optimizer identified as being potentially good plans. In such an example, it may be impossible to recover information on all the physical plans the query optimizer considered. Additionally, different database management systems typically make metadata on the plans that were considered available in different formats (if it is made available at all). For example, System Y and MySQL may both provide trace files which record the physical plans the query optimizer considered for a given query, but as MySQL resolves all joins to nested-loop joins the trace file only lists the different join orderings the optimizer considers and not the join algorithm that was used (as this data would always be the same). Whereas the trace file of System Y may list all complete physical plans, including which join algorithms were used. Accordingly, API 112 can include one or more functions consistent with the metadata produced by the database management system to expose information related to the plans considered by the query optimizer. For example, the API can include at least one of the following functions:

1. List<PPlan> logicalPlans (Query q), can return all logical plans considered by the optimizer for a given query q;
2. List<LPlan> logicalJoinPlans (Query q), can return all logical join plans considered by the optimizer for a given query q;
3. List<LPlan> physicalPlans (Query q), can return all physical plans considered by the optimizer for a given query q;
4. List<PPlan> physicalJoinPlans (Query q), can return all physical join plans considered by the optimizer for a given query q;

where PPlan are physical plans and LPlan are logical plans in any format the DBMS supports. In some embodiments (e.g., as describe below in connection with FIG. 5), evaluation system 132 can assess the efficiency of a query optimizer based on the number of plans returned by any of the above functions the database management system has implemented.

Figure 2:
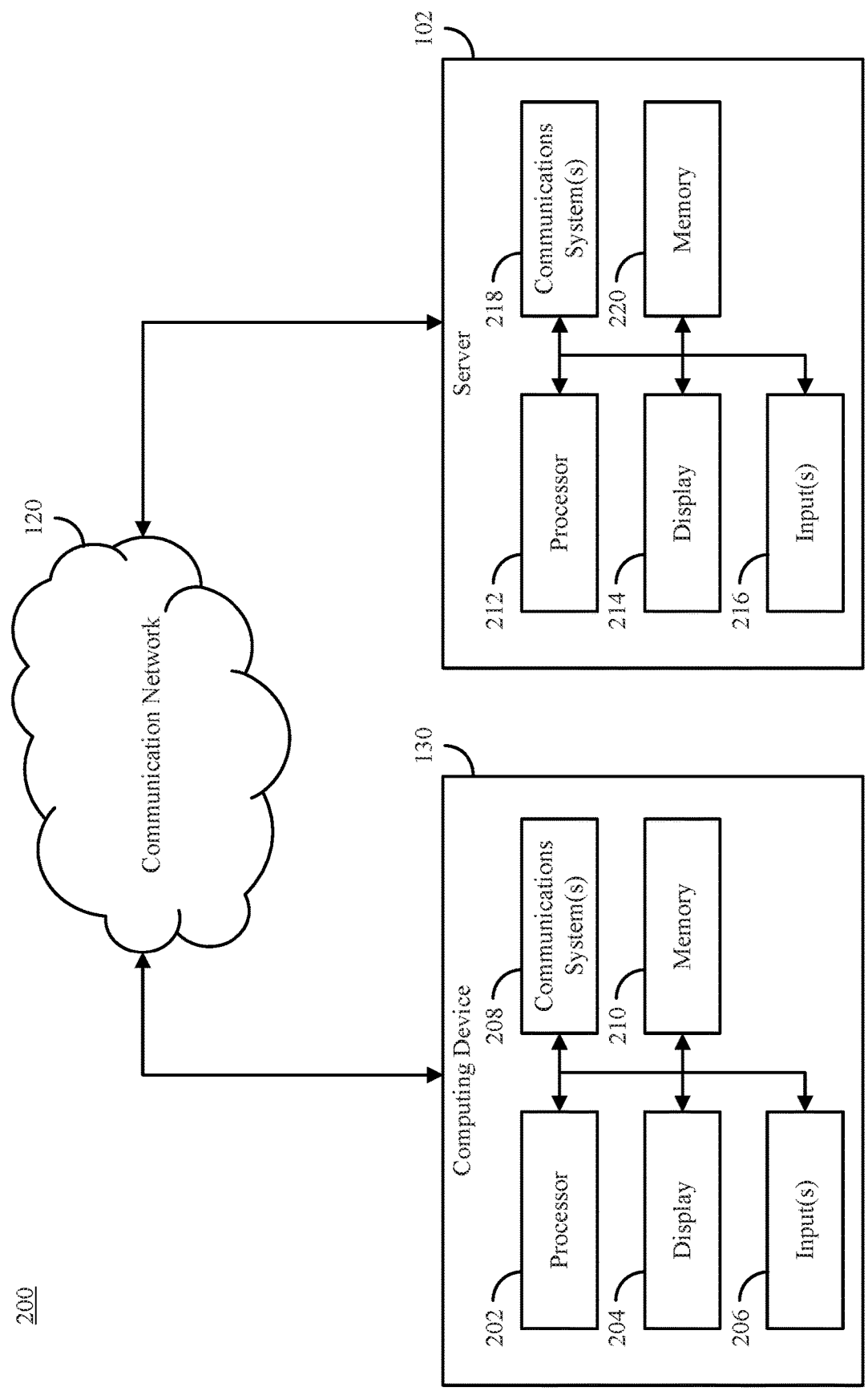
FIG. 2 shows an example of hardware that can be used to implement the server and the computing device shown in FIG. 1 in accordance with some embodiments of the disclosed subject matter.

FIG. 2 shows an example 200 of hardware that can be used to implement server 102 and computing device 130 in accordance with some embodiments of the disclosed subject matter. As shown in FIG. 2, in some embodiments, computing device 130 can include a processor 202, a display 204, one or more inputs 206, one or more communication systems 208, and/or memory 210. In some embodiments, processor 202 can be any suitable hardware processor or combination of processors, such as a central processing unit (CPU), a graphics processing unit (GPU), etc. In some embodiments, display 204 can include any suitable display device, such as a computer monitor, a touchscreen, a television, etc. In some embodiments, inputs 206 can include any suitable input devices and/or sensors that can be used to receive user input, such as a keyboard, a mouse, a touchscreen, a microphone, etc.

In some embodiments, communications systems 208 can include any suitable hardware, firmware, and/or software for communicating information over communication network 120 and/or any other suitable communication networks. For example, communications systems 208 can include one or more transceivers, one or more communication chips and/or chip sets, etc. In a more particular example, communications systems 208 can include hardware, firmware and/or software that can be used to establish a Wi-Fi connection, a Bluetooth connection, a cellular connection, an Ethernet connection, etc.

In some embodiments, memory 210 can include any suitable storage device or devices that can be used to store instructions, values, etc., that can be used, for example, by processor 202 to present content using display 204, to communicate with server 120 via communications system(s) 208, etc. Memory 210 can include any suitable volatile memory, non-volatile memory, storage, or any suitable combination thereof. For example, memory 210 can include RAM, ROM, EEPROM, one or more flash drives, one or more hard disks, one or more solid state drives, one or more optical drives, etc. In some embodiments, memory 210 can have encoded thereon a computer program for controlling operation of computing device 130. In such embodiments, processor 202 can execute at least a portion of the computer program to present content (e.g., user interfaces, tables, graphics, etc.), receive content from server 102, transmit information to server 102, implement one or more portions of evaluation system 132, etc.

In some embodiments, server 102 can include a processor 212, a display 214, one or more inputs 216, one or more communications systems 218, and/or memory 220. In some embodiments, processor 212 can be any suitable hardware processor or combination of processors, such as a central processing unit, a graphics processing unit, etc. In some embodiments, display 214 can include any suitable display devices, such as a computer monitor, a touchscreen, a television, etc. In some embodiments, inputs 216 can include any suitable input devices and/or sensors that can be used to receive user input, such as a keyboard, a mouse, a touchscreen, a microphone, etc.

In some embodiments, communications systems 218 can include any suitable hardware, firmware, and/or software for communicating information over communication network 120 and/or any other suitable communication networks. For example, communications systems 218 can include one or more transceivers, one or more communication chips and/or chip sets, etc. In a more particular example, communications systems 218 can include hardware, firmware and/or software that can be used to establish a Wi-Fi connection, a Bluetooth connection, a cellular connection, an Ethernet connection, etc.

In some embodiments, memory 220 can include any suitable storage device or devices that can be used to store instructions, values, etc., that can be used, for example, by processor 212 to present content using display 214, to communicate with one or more computing devices 130, etc. Memory 220 can include any suitable volatile memory, non-volatile memory, storage, or any suitable combination thereof. For example, memory 220 can include RAM, ROM, EEPROM, one or more flash drives, one or more hard disks, one or more solid state drives, one or more optical drives, etc. In some embodiments, memory 220 can have encoded thereon a server program for controlling operation of server 102. In such embodiments, processor 212 can execute at least a portion of the server program to transmit information and/or content (e.g., results of a database query, a user interface, etc.) to one or more computing 130, receive information and/or content from one or more computing devices 130, receive instructions from one or more devices (e.g., a personal computer, a laptop computer, a tablet computer, a smartphone, etc.), implement one or more portions of evaluation system 132, etc.

Figure 3:
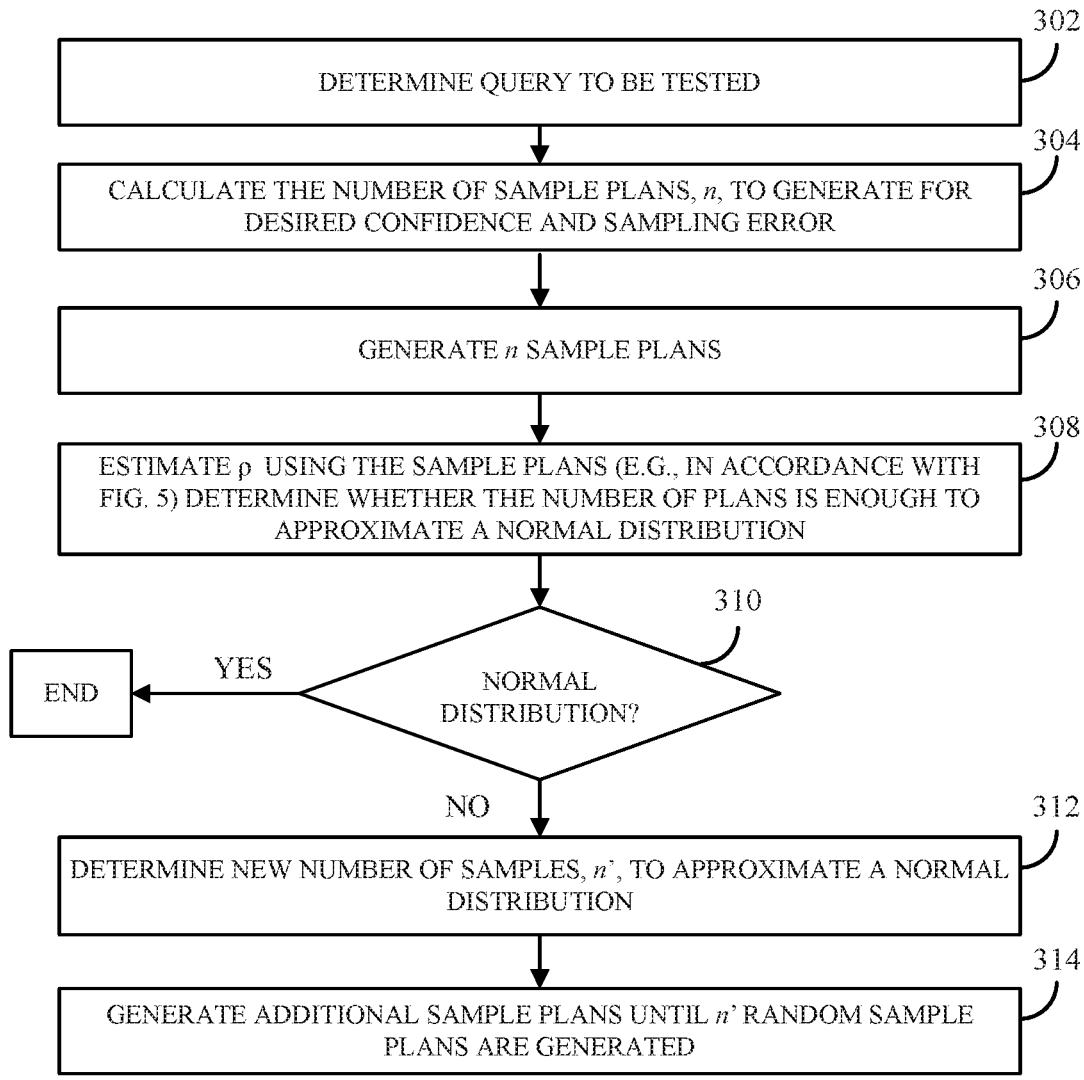
FIG. 3 shows an example of a process for generating a set of plans for executing a query in accordance with some embodiments of the disclosed subject matter.

FIG. 3 shows an example 300 of a process for generating a set of plans for executing a query in accordance with some embodiments of the disclosed subject matter. As shown in FIG. 3, at 302, process 300 can determine a query (e.g., query q) that is to be used to evaluate a query optimizer (e.g., query optimizer 106) of a database management system (e.g., database management system 104). In some embodiments, process 300 can use any suitable technique or combination of techniques to determine the query to be tested. For example, process 300 can select the query from a set of queries (e.g., set Q) stored on the computing device (e.g., computing device 130 or server 102) executing process 300. As another example, process 300 can receive the query from a remote source. As yet another example, process 300 can receive the query from an input device (e.g., a keyboard) as input from a user. As still another example, process 300 can select the query from the a set of queries used for benchmarking the performance of a database management system available from the TPC and associated with the TPC-DS benchmark available at www (dot) tpc (dot) org/tpcds.

At 304, process 300 can calculate the number of sample plans, n, to generate based on the level of precision of the evaluation. In some embodiments, process 300 can use the following equation to estimate the value of n required to generate a sample of plans that is expected to represent the full set of possible plans that could be used to execute a query:

$$n = \frac{z^2 \hat{p}(1-\hat{p})}{\epsilon}, \quad (3)$$

where $\epsilon$ is the desired level of precision (i.e., sampling error), Z is the value from the standard normal distribution that corresponds to the desired confidence level (e.g., Z=1.96 for a confidence interval of 95%) and $\hat{p}$ is an estimate of the proportion of plans that are worse than the optimizer-chosen plan. However, $\hat{p}$ is unknown in advance and can be set to a default value, such as $\hat{p}$=0.5, as this would give the biggest sample size for a given confidence level and margin of error. Note that, in some embodiments, rather than calculating n, process 300 can determine n using other techniques, such as by looking up the value of n in a table.

At 306, process 300 can randomly generate n sample plans for executing the query determined at 302 that can be executed by the query execution engine of the database management system. Process 300 can use any suitable technique or combination of techniques to generate the n random plans. For example, in some embodiments, process 300 can generate the plans by varying one or more of three features that can be used to characterize query plans: the join ordering, the physical join algorithm used for each join, and/or table access methods.

In some embodiments, process 300 can produce a random join ordering for a given query and then expand the plan with randomly selected physical join operations and access methods. In some embodiments, join orderings can be represented as binary trees (sometimes referred to as join trees) where internal nodes represent join operations and leaf nodes represent tables. Process 300 can produce an unbiased random binary join tree, and can generate a random sequence of tables to populate the leaves of the join tree. In some embodiments, the join ordering for a plan can be represented as a pair (s, l), where s is a bit sequence that represents the preorder traversal of the ordering's binary tree such that each successive bit denotes the next node of the tree visited in the traversal, and l represents the sequence of tables to populate the leaf nodes in the binary tree. In the bit sequence s, a value of '1' can corresponds to an internal node (i.e., to a join) and a value of '0' can correspond to a leaf node (i.e., a table). For example, a bit sequence having length (2i−1) consisting of (i−1) '1's and i '0's can represent a join order for a query that references n tables. In a more particular example, the bit sequence "1011000" can represent the encoding for the join tree shown in FIG. 4. In some embodiments, l can be some permutation of the tables accessed by the query, where the permutation sequence can specify the leaves of the join tree from left to right. For example, if the query references tables A, B, C and D, then the permutation "CBDA" can be implemented such that T1=C, T2=B, T3=D and T4=A in the join tree shown in FIG. 4.

In some embodiments, process 300 can generate random join orderings by generating random encodings of join trees (s, l) using any suitable technique or combination of techniques. For example, in some embodiments, process 300 can generate the bit sequence s by essentially performing the equivalent of a biased coin flip for each bit in the sequence (e.g., from left-to-right), where the bias is based on the previous values in the sequence. As the last bit in the bit sequence must be a '0' (since the last visited node in a preorder traversal must be a leaf node aka a table) process 300 can generate (2i−1) bits at random and add a '0' at the end. For each bit in the sequence s, process 300 can determine the probability that the bit should be filled with a '0', which can be expressed as P(r,k) such that r is the number of '1's already in the bit sequence minus the number of '0's in the bit sequence, and k is the number of bits that have yet to be assigned. Process 300 can calculate P(r,k) as follows:

$$P(r, k) = \frac{r(k+r+2)}{2k(r+1)}, \quad (4)$$

In some embodiments, process 300 can also generate a random permutation l of the tables in the query to generate a random join ordering (s, l).

In some embodiments, process 300 can replace each join operator with a randomly selected physical join operator to generate a physical plan to include in the sample. For each join node in the join tree, if its inputs have no corresponding join predicate in the query, process 300 can force a cross join. Otherwise, process 300 can randomly select one of the physical join operators supported by the query execution engine. In some embodiments, process 300 can also add random access methods for each input table by randomly selecting either an applicable index for the table (if at least one exists) or a sequential scan as the table access method. Process 300 can use these techniques to create sample plans until n samples are generated.

As described above in connection with API 112, process 300 can request information from an API associated with the database management system being evaluated (e.g., API 112) and/or from the database management system to determine which types of joins are supported, and which tables are associated with indexes. Additionally or alternatively, in some embodiments, process 300 can receive information related to the database management system, and can look up at least a portion of the information from memory. For example, user input can be provided identifying which type of database management system is being evaluated, and process 300 can use this information to obtain information such as which types of joins are supported, syntax for hint queries, etc., that are common to all examples of that type of database management system.

At 308, process 300 can determine whether the number of plans calculated at 304 is enough for the binomial distribution to approximate a normal distribution. In general, EQ. 3 can produce a reliable estimate when at least two conditions are satisfied: (i) that the plans in the sample are selected randomly from the full set of possible plans (i.e., that each plan in the sample has the same probability of being generated); and (ii) that the distribution of the number of plans in n that are worse than the plan selected by the query optimizer can be approximated as a normal distribution. However, the distribution of the plans that perform worse than the chosen plan is a Binomial distribution (since each plan in the search space is either worse than the optimal plan or not), not a normal distribution as required. Accordingly, process 300 can check the sample size calculated using EQ. 3 to determine whether the sample size approximates a normal distribution (e.g., based on the de Moivre-Laplace theorem). In some embodiments, process 300 can determine whether the sample size is adequate using the following conditions:

$$n \times \rho \geq 5, \quad (5)$$

$$n \times (1-\rho) \geq 5, \quad (6)$$

where n is the sample size and $\rho$ is the proportion of plans with a certain property, with that property corresponding to the relative performance factor as described herein (i.e., the proportion of plans in the search space that are worse than the optimizer-chosen plan).

In some embodiments, process 300 can use the n samples to estimate the actual portion of sample plans that satisfy the property using any suitable technique or combination of techniques (e.g., process 300 can calculate p, which corresponds to the relative performance factor as described herein). An example of a process for calculating the relative performance factor is described below in connection with FIG. 5.

In some embodiments, process 300 can determine whether the number of plans is "enough" for the binomial distribution of the n samples to approximate a normal distribution by determining whether, given the relative performance factor and the number of samples n, the distribution satisfies the conditions described above in connection with EQS. 5 and 6.

If process 300 determines that the number of samples is large enough ("YES" at 310), process 300 can end. Otherwise, if process 300 determines that the number of samples is not large enough ("NO" at 310), process 300 can move to 312 to calculate a new sample size n' that will be large enough to approximate a normal distribution.

At 312, process 300 can calculate a new larger sample size n' (n'>n) that will be large enough to approximate a normal distribution. In some embodiments, when the search space is not large enough to satisfy both of these conditions, process 300 can use an alternate calculation to determine the number of samples, n', needed to generate results with the sampling error and precision required. In some embodiments, if process 300 were to use uniform random sampling to estimate p, the proportion of a population with some property (in this case the property being whether it is better than the query optimizer chosen plan), and the sample size n satisfies the following condition:

$$n \geq \frac{2+\epsilon}{\epsilon^2} \ln \frac{2}{\delta},$$

then the estimator $\hat{\rho}$ of $\rho$ satisfies:

$\rho \in [\rho-\epsilon, \rho+\epsilon]$ with probability at least $1-\delta$, where $\epsilon$ is the desired level of precision (i.e., sampling error) and $1-\delta$ is the confidence level (where the confidence level can be user defined), as described in more detail as follows. If X is a random variable indicating the number of elements in the sample of size n that satisfy the property $\rho$, $\mu$ is the expectation of X, and $\theta>0$, then:

$$Pr[|X - \mu| \geq \theta_\mu] \leq 2e^{-\frac{\theta^2}{2+\theta}\mu}.$$

Because X~Binomial(n,$\rho$), $\mu$=E(X)=n$\rho$. Therefore, $$Pr[|X - np| \geq \theta_{np}] \leq 2e^{-\frac{\theta^2}{2+\theta}n\rho} \Leftrightarrow Pr[|\hat{\rho} - \rho| \geq \theta_\rho] \leq 2e^{-\frac{\theta^2}{2+\theta}n\rho}.$$

If the sampling error $\Sigma=\theta\rho$, then:

$$Pr[|\hat{\rho} - \rho| \geq \epsilon] \leq 2e^{-\frac{\frac{\epsilon^2}{\rho^2}}{2+\frac{\epsilon}{\rho}}n\rho} \Leftrightarrow Pr[|\hat{\rho} - \rho| \geq \epsilon] \leq 2e^{-\frac{\epsilon^2}{2\rho+\epsilon}n} \leq 2e^{-\frac{\epsilon^2}{2+\epsilon}n}.$$

Letting $$2e^{-\frac{\epsilon^2}{2\rho+\epsilon}n} \leq \delta,$$

when $$n \geq \frac{2+\epsilon}{\epsilon^2} \ln \frac{2}{\delta},$$

the estimator $\hat{\rho}$ of $\rho$ satisfies:

$\hat{\rho} \in [\rho-\epsilon, \rho+\epsilon]$ with probability at least $1-\delta$.

Accordingly, process 300 can calculate n' when n was determined to be an insufficiently sized sample as follows:

$$n' = \frac{2+\epsilon}{\epsilon^2} \ln \frac{2}{\delta}, \quad (7)$$

At 314, process 300 can generate additional random plans (e.g., as described above in connection with 306) until process 300 has generated n' random sample plans.

Figure 4:
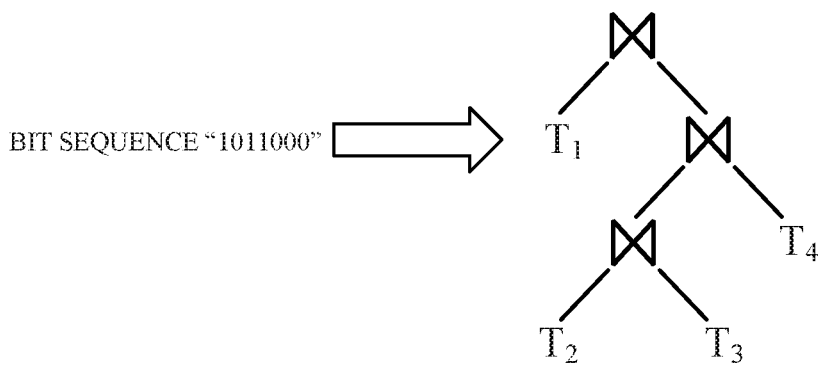
FIG. 4 shows an example of a bit sequence and a corresponding join tree that represents the bit sequence in accordance with some embodiments of the disclosed subject matter.
Figure 7A:
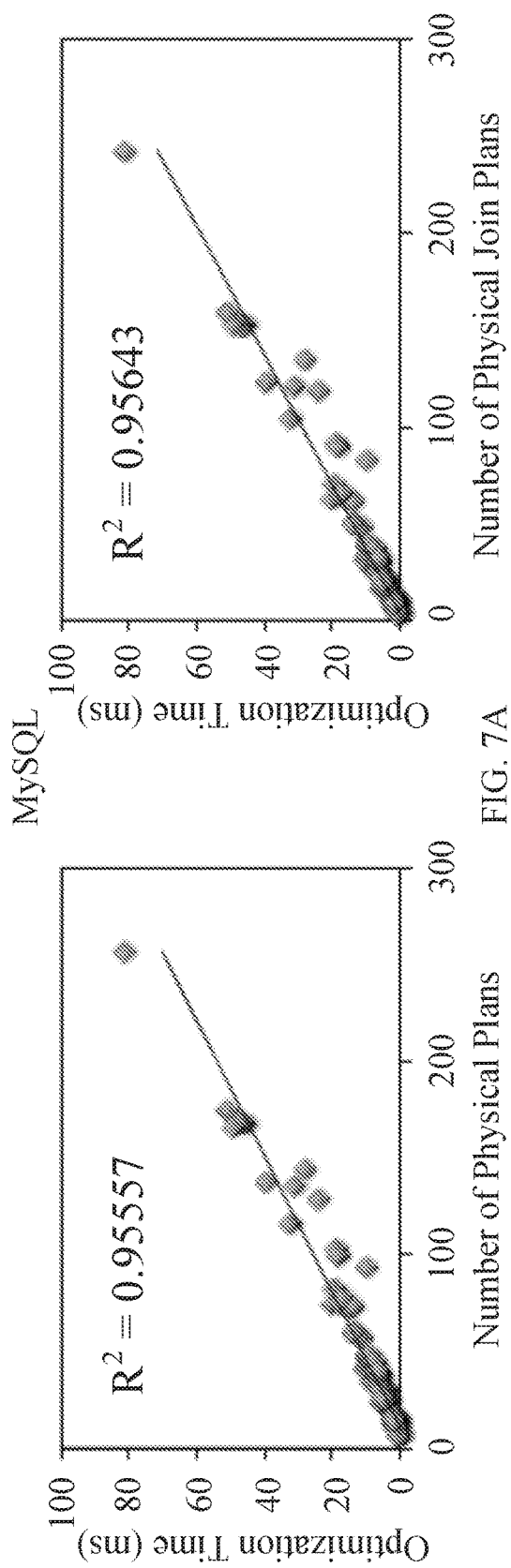
Figure 7B:
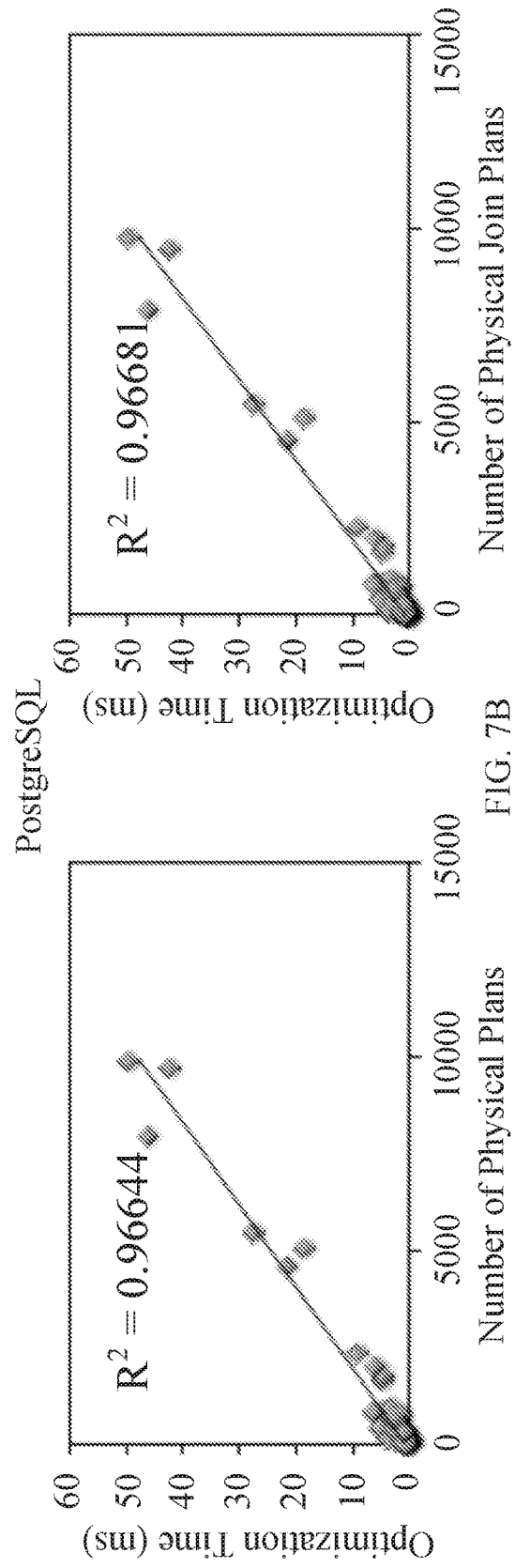

FIG. 4 shows an example of a bit sequence and a corresponding join tree which it can represent in accordance with some embodiments of the disclosed subject matter.

FIG. 5 shows an example 500 of a process for evaluating a query optimizer of a database management system in accordance with some embodiments of the disclosed subject matter. As shown in FIG. 5, at 502, process 500 can submit a query to be tested to the database management system. As described above in connection with FIG. 3, the query can be any suitable query that references any suitable number of tables, and can be part of a set of queries that is to be used to evaluate the database management system. In some embodiments, process 500 can submit the query using any suitable technique or combination of techniques.

At 504, process 500 can receive information related to the plan that was selected by the query optimizer. In some embodiments, the information related to the plan that was selected can include information on the runtime of the plan, information identifying the join ordering, the join algorithms used, and/or whether an index or scanning was used to access each table.

At 506, process 500 can receive information related to plans considered by the optimizer. In some embodiments, process 500 can request information from an API associated with the database management system (e.g., API 112) related to the plans considered by the query optimizer. For example, process 500 can submit one or more of the following requests to the API: List<PPlan> logicalPlans (Query q); List<LPlan> logicalJoinPlans (Query q); List<LPlan> physicalPlans (Query q); List<PPlan> physicalJoinPlans (Query q); and can receive an enumeration and/or or count of the plans that were considered by the query optimizer.

At 508, process 500 can receive information related to the execution of the plan selected by the query optimizer. For example, in some embodiments, process 500 can receive information on the runtime of the plan selected by the query optimizer.

At 510, process 500 can cause the database management system to execute n plans from the possible plans that could be used to execute the query being tested. For example, process 500 can cause the database management system to execute the randomly generated plans generated by process 300. In some embodiments, process 500 can use any suitable technique or combination of techniques to cause the database management system to execute the plans. For example, in some embodiments, process 500 can create a SQL query that enforces the specified join ordering, join algorithm and table access method specified by each plan to be executed. In such an example, the join orderings and the choice of join operations can be enforced according to directives specified by a response to the joinHint( ) function, while the access method can be enforced by adding the SQL directive specified by indexHint( ) function. Process 500 can submit the hint-based SQL queries to the database management system.

At 512, process 500 can receive information related to the execution of the n plans from the possible plans that could be used to execute the query being tested. For example, in some embodiments, process 500 can receive information on the runtime of the randomly generated plans produced by process 300.

At 514, process 500 can calculate one or more performance metrics for the query optimizer based on the information related to the selected plan, the considered plans, the execution of the selected plan, and/or the execution of the generated plans (e.g., the information received at 504-508 and 512). In some embodiments, process 500 can calculate any suitable metric(s). For example, process 500 can calculate the relative performance factor (RPF), the absolute performance factor (APF), the optimality frequency of the query optimizer, and/or the efficiency of the query optimizer.

In some embodiments, given the execution times of each sample plan for a given query, process 500 can determine the relative performance factor for that query by determining the proportion of sample plans that the selected plan outperformed. Note that, in some embodiments, as described above in connection with FIG. 3, based on the sample size n and the relative performance factor p, additional sample plans may be required and process 500 can return to 510 to evaluate the performance of each of the additional sample plans generated by process 300 until, for example, n' plans have been evaluated. In some embodiments, 502-514 can be repeated for each query in the set of queries to be evaluated.

In some embodiments, process 500 can calculate the absolute performance factor to find the absolute difference between the execution time of the selected plan and the inferred execution time of the optimal plan. As described above in connection with EQ. 2, the absolute performance factor of an optimizer $O_D$ relative to a query q, $APF(O_D,q)$, can indicate the absolute performance difference of the execution time between the plan selected by the optimizer and the relative optimal plan. However, as enumerating all possible plans to find the optimal plan of query q is impractical for most relatively complex queries, process 500 can use a statistical analysis approach that generates an estimate of the APF using the sample plans generated by process 300. More particularly, in some embodiments, process 500 can use bootstrapping techniques to estimate the APF using the results generated by the sample plans. In general, bootstrapping is a statistical technique of estimating statistics of an estimator by measuring those properties from just one sample set. The technique can involve random sampling with replacement, resampling and computation of the bootstrap distribution. Resampling is the process of creating many resamples by repeatedly sampling with replacement from just one original sample set. Given the resamples, the distribution of the statistic in question can be recalculated over the many resamples, which can result in the bootstrap distribution having approximately the same shape and spread as the sampling distribution, but which may have a biased center. Accordingly, the bootstrap distribution is the estimated distribution of the statistic in question. In this case, process 500 can use the bootstrap distribution to draw many statistical conclusions about the distribution of execution times of all of the possible plans that could be used to execute the query. For example, the bootstrap distribution can be used to derive a confidence interval for the statistic.

In some embodiments, process 500 can evaluate the APF for the query by using bootstrapping techniques to estimate the distribution of the execution time of the optimal plan for a given query q in database management system DB, and then use the distribution to estimate the absolute performance factor. For example, process 500 can acquire a sample S of the search plan space of size n for a given query q in the DB, which can be the results of the execution of the sample plans generated to determine relative performance factor (i.e., the n or n' plans generated by process 300). Process 500 can then use bootstrapping techniques to generate a number of resamples with sample size m by sampling with replacement from S. To generate these resamples process 500 can use m-out-of-n bootstrap (e.g., as described in J. Shao, *The Jacknife and Bootstrap*, Springer Science+Business Media, LLC, 1995, which is hereby incorporated by reference herein in its entirety) with resample size m<n and m=o(n) (i.e., m→∞ as n→∞ but m/n→0 as m and n→∞). In a more particular example, process 500 can set m=

√n. Note that a commonly used technique of full-sample bootstrap (i.e., where the resamples have the same size as the original sample) is typically not appropriate for estimating extremes, such as the estimate of the execution time of the optimal plan to be used to estimate the APF. Within each resample, process 500 can estimate the minimum execution time of the plans included in the sample, and hence generate a distribution of minimum execution time D of the resamples.

As noted above, bootstrapping may generate a distribution with a biased center. For example, if D is centered at value μ (i.e., expected value is μ), and the actual minimum execution time in S is $t_{min}$, then the estimated distribution of the minimum execution time, D', can be obtained by shifting left the distribution D to be centered at $t_{min}$. Process 500 can then estimate the APF, given the execution time r(DB, $O_D$(q)) of the query optimizer selected plan returned by optimizer $O_D$ for query q, the minimum execution time in the original sample S of $t_{min}$, and the random variable for the true optimal execution time T (so that D' is the estimated distribution of T), then the estimated absolute performance factor relative to a query q of optimizer $O_D$ can be represented as:

$$APF(O_D, q) = \frac{E[T \mid T \leq t_{min}]}{r(DB, O_D(q))}, \quad (8)$$

Given the distribution D', process 500 can calculate $E[T|T \leq t_{min}]$ by truncating the distribution D' at value $t_{min}$ and keeping only the part to the left of $t_{min}$. That is, process 500 can produce a sub distribution, $D_{sub}$, which can then be normalized so that the total probability mass is 1, where $E[T|T < t_{min}]$ is the expected execution time on the distribution $D_{sub}$, which process 500 can then use with EQ. 8 to estimate the APF. Note that the absolute performance factor as described herein penalizes large performance differences. That is, the lower the factor is, the larger the performance difference is between the optimal plan and the plan selected by the query optimizer.

In some embodiments, process 500 can evaluate the optimality frequency for the set of queries that were individually evaluated by calculating the percentage of queries where the relative performance factor is 1, indicating the percentage of queries where the query optimizer selected the optimal plan.

In some embodiments, process 500 can also identify whether each plan in a sample that performed better than the plan selected by the optimizer was considered by the query optimizer. For example, process 500 can use the API function isCostedPlan( ) to check whether the plan was considered (i.e., costed) by the optimizer. For a plan that is not considered by the optimizer although it performs better than the selected plan, process 500 can indicate that the query optimizer likely used a less than optimal enumeration strategy for that query. For a plan that performs better than the optimizer-chosen plan but it is not chosen, process 500 can indicate that the cost model used by the query optimizer was inaccurate for that query. Additionally, in some embodiments, process 500 can identify the number of the plans in the sample, for each query, that were considered and the number of the plans that were not considered by the query optimizer, which can provide valuable information to developers. For example, it may provide an indication of the quality of the cost model and plan enumeration strategy of the query optimizer.

In some embodiments, process 500 can calculate one or more metrics correlated with the efficiency of the query optimizer. In general, there is a trade-off between the quality of the plan selected by a query optimizer and the resources the query optimizer uses to identify the selected plan. While the goal of a query optimizer is ostensibly to discover the best possible plan, a query optimizer that exhaustively examined all possible plans would likely be highly inefficient. In practice, a query optimizer typically attempts to find a "good enough" plan within a limited time available for query optimization. For example, many query optimizers have timeout settings that stop the query optimizer before all possible plans can be considered. Metrics that are correlated with the efficiency of an optimizer can provide information that a developer can use to understand the trade-off between effectiveness and efficiency (especially in combination with the other metrics described herein).

In general, the efficiency of a query optimizer reflects the time needed for the optimizer to choose a query plan. One possible approach to measure a query optimizer's efficiency would be to calculate the average time the query optimizer spends optimizing queries of a given query set. However, this metric may depend more on the underlying computing platform and hardware resources that are being used to execute the database management system, rather than the efficiency of the query optimizer itself. Instead metrics that correlate well with optimization time (e.g., based on regression analysis), and which can be used as indicators of the optimization time may be more useful in evaluating the actual efficiency of the query optimizer itself. Furthermore, metrics that are comparable independently of the underlying hardware and software platform (e.g., the database management system query execution engine and storage engine) are more useful for in evaluating the actual efficiency of the query optimizer. The following metrics can be used as indicators of the optimization time:

1. # LP: the number of logical plans enumerated,
2. # JO: the number of join orderings enumerated,
3. # PP: the number of physical plans costed, and
4. # PJ: the number of physical join plans costed.

As described below, these metrics can be calculated for a given query, and are all correlated with optimization time. In some embodiments, process 500 can calculate an averages of one or more of the above efficiency metrics calculated over a given set of queries that were tested.

While any one of the above metrics can, by itself, be used as an indication of optimization time, under the assumption that different database management systems may make different information available, the more of these indicators that can be calculated for a given database management system the more other systems it can be compared to with respect to its query optimizer's efficiency.

In some embodiments, a developer can use mechanisms described herein, such as processes 300 and/or 500, to determine which of various different available database management systems to use to implement a particular database. Additionally or alternatively, in some embodiments, a developer of a query optimizer for a database management system can use mechanisms described herein to evaluate changes made to the query optimizer. For example, the developer can use techniques described herein to evaluate the query optimizer, can make one or more changes to query optimizer, and can use techniques described herein to reevaluate the query optimizer to determine whether, and by how much, the change(s) affected performance.

FIG. 6 shows an example of the correlation factor of each of the above metrics with the optimization time for four different database management systems (where System X and System Y are commercial systems) in accordance with some embodiments of the disclosed subject matter. FIG. 6 shows the degree of correlation between each metric and the time spent by the different database management systems averaged over the 93 join queries from the TPC-DS benchmark. As shown in FIG. 6, these metrics are strongly correlated with optimization time. Correlation is demonstrated with $r^2$ values that show the goodness-of-fit of the linear regression, and that fall between 0.0 and 1.0 with higher values indicating higher correlation.

As shown in FIG. 6, the most highly correlated metric (shown for each database management system in boldface) varies from system to system, demonstrating that there is no single "best" metric for all systems. However, all metrics have very strong correlations (e.g., over 0.7 in all cases tested) with the optimization time, and therefore can be used as indicators of an optimizer's optimization time. Note that the correlation of physical plans and physical join plans, and that of logical plans and logical join plans (join orderings) are very close to, or sometimes identical to each other on all the database management systems, as the number of non-join plans (e.g., table scan plans and index scan plans) considered are typically much fewer than join plans, and thus take much less optimization time.

To generate the results in FIG. 6, different techniques were used for each database management system. Specifically, for System X, an optimization structure exposed with meta data about the optimization process was processed. For PostgreSQL, the optimizer code was modified to add instrumentation for collecting these metrics. Finally, for MySQL and System Y, trace files provided by the database management system were parsed. These techniques facilitate counting of the physical plans that were costed by each database management system during optimization, and from these results determination of the values of the other metrics were possible: determining physical join plans by removing all non-join physical plans (e.g., group-by plans and index plans) from the physical plans, determining logical plans by converting each physical operator in the physical plan to its logical equivalent and ignoring duplicates, and determining join orderings on the basis of physical join structures.

FIGS. 7A to 7D show examples of optimization times compared to the number of plans considered for various database management systems in accordance with some embodiments of the disclosed subject matter. Note that MySQL shows a quite strong correlation of the logical plans: almost as high as the correlation of the physical plans. MySQL resolves all joins to nested-loop joins and when mapping logical plans to physical plans it only needs to convert selection operators to table access methods (e.g., table scan, index scan). Accordingly, reconstruction many of the logical plans was possible using techniques described herein, as very few logical plans are pruned before converting to physical plans. On the other hand, # LP and # JO seem to be a stronger predictors of optimization time than the physical plan metrics # PP and # PJ for System X. For this engine, all logical plans and join orderings considered by the optimizer were made available from the database management system resulting in a relatively high correlation. However, the data structure offered by the specific engine of System X only reports the physical plans that the optimizer considered to be "promising" plans, and a high percentage of the pruned plans are not reported although they do add an overhead to the optimization process (since the optimizer examined them). Accordingly, the analysis used a reduced set of physical plans and the regression results thus show a lower correlation of # PP compared with # LP.

As shown in FIGS. 6 and 7A to 7D, when all of the set of logical (join) plans or physical (join) plans the optimizer considered are accounted for, the correlation between the number of plans and the optimization times is very high in all systems. Even in the cases where it is not possible to reconstruct the whole set of plans, the correlation is also very high, indicating that these metrics can be used for evaluating an optimizer's efficiency. Finally, the fact that the correlation remains relatively constant between whole plans and join plans demonstrates that the dominant factor of the optimization time is identifying candidate join plans.

FIG. 8 shows examples of relative performance factor and absolute performance factor for various queries from the TPC-DS benchmark set for three database management systems in accordance with some embodiments of the disclosed subject matter. As shown in FIG. 8, RFP and APF were calculated for three database management systems: MySQL, a commercial system with a top-down optimizer (System X), and a commercial system with a bottom-up optimizer (System Y).

Various techniques described herein were implemented as a toolkit application on a server equipped with a 3.06 GHz Octa CPU and 32 GB of memory. The TPC-DS benchmark was used to generate the benchmarking dataset and query suite. A first set of profiling queries consisted of 24 queries with a minimum of 5 tables in each query, with a 100 GB dataset.

At least a portion of the API functions described above in connection with API 112 were implemented for each of System X, System Y, and My SQL. For example, the System X implementation of an API included the functions:
 1. Set{String} joinTypes( ) {return {HASH, MERGE, LOOP};}
 2. String indexHint(String t, String ind) {return WITH (INDEX(+ind+));}
 3. String joinHint(String t1,String al1, String idx1, String t2, String al2, String idx2,String join, String clause) {return SELECT*FROM+t1+idx1+INNER+join+ JOIN+t2+idx2+ON+clause;}

For the API function isCostedPlan(Query q, Plan p), a determination was made as to whether the plan p was included in the optimization structure exposed by System X in optimizing query q. Given the above API, if the hint syntax for joining two tables A and B is required using hash join and their corresponding indexes are indexA and indexB, the system executing techniques described herein can call the function:
 joinHint(A, A, indexHint(A, indexA), B, B, indexHint(B, indexB), HASH, A.a=B.b),
which returns the hint-based query expression:
 SELECT*FROM A WITH (INDEX(indexA)) INNER HASH JOIN B WITH (INDEX(indexB)) ON A.a=B.b.

As shown in FIG. 8, effectiveness results were generated for various queries in accordance with techniques described herein. The results in FIG. 8 were generated using a 95% confidence level (i.e., Z=1.96) and a 5% margin of error (i.e., c=0.05) to determine the sample size for each profiling query.

FIG. 8 includes the relative and absolute performance factor of each query for System X. Based on these results, the optimality frequency of System X is 0.5, and hence the optimizer of System X chooses the relative optimal plan in no more than 50% of the queries. The average relative performance factor for the queries that do not find the relative optimal plan is 0.927. Furthermore, with 95% confidence, System X finds a plan that is better than 80% of the generated sample plans (RPF±5%>80%) for 96% of the queries.

For System X, at most 50% of the queries use the best plan (these are the queries in FIG. 8 with a performance factor of 1). For the rest of the queries the results can be interpreted using the 95% confidence and the 5% margin of error used to generate the sample set of plans. For example, the relative performance factor of query 13 is shown as 0.88, hence, with 95% confidence the plan selected by the optimizer is better than 88%±5% of plans in the search space of all possible plans that System X could use to execute query 13. The relative performance factor of query 26 is 0.899, which is very close to that of query 13. From the relative performance factor it appears that the plan selected by the query optimizer of System X for query 13 and query 26 rank almost the same in their search spaces, respectively. However, the absolute performance factor of query 13 is 0.87, while that of query 26 is 0.755, which is indicative of the absolute difference between the plan selected by the query optimizer and the optimal plan. Accordingly, the plan selected for query 13 is apparently much closer to the optimal plan than the plan selected for query 26.

While the optimality frequency (0.5) of System X shows that in half of the queries the chosen plan was not the best, in 96% of the queries the chosen plan was better than 80% of the plans in the sample set. Accordingly, a developer of the optimizer could conclude that, while the plan selected by the query optimizer of System X might not be the best in half of the cases, it is one of the top plans, which may be a good enough plan for an query optimizer with limited resources and limited time.

For the queries with performance factor less than 1, the plans that perform better than the selected plan can be analyzed to evaluate the quality of the cost model and plan enumeration approach. For 29 queries having the lowest relative performance factor there were 71 plans in the sample that did better than the selected plan. Among these 71, there were 54 plans that were considered by the query optimizer, while 17 plans were not considered by the query optimizer. As not all physical plans the query optimizer considered could be extracted for System X, the number of plans considered here serves as a lower bound. This indicates that the cost model failed to accurately estimate the cost of at least 54/71 (76%) of the better plans, while the enumeration quality was relatively high as the optimizer failed to consider only 17/71 (24%) of the better plans.

For query 18, which also has a relatively low relative performance factor, there were 56 plans in the sample that did better than the selected plan. Out of this set, 24 plans were considered by the optimizer, while 32 plans were not. So the cost model failed to accurately estimate the cost of at least 43% of plans for query 18, while the enumeration approach did not even consider 57% of these better plans.

Finally, to evaluate the efficiency of the optimizer for these queries the number of logical plans were collected. For query 29, the optimizer considered 93 logical plans, while for query 18, the optimizer considered only 74 logical plans, indicating the optimizer was more efficient in coming up with a plan for query 18.

FIG. 8 also includes the relative and absolute performance factor of each query for System Y. The optimality frequency of System Y is 0.45, that is, the query optimizer of System Y chose the relative optimal plan in no more than 45% of the queries. The average relative performance factor for the queries that do not find the relative optimal plan is 0.868. Finally, with 95% confidence, System Y finds a plan that is better than 80% of the generated sample plans (RPF±5%>80%) for 87% of the queries.

For System Y, at most 45% of the queries used the best plan. For the remaining queries the results should be interpreted with 95% confidence level and 5% margin of error. For query 7 with relative performance factor 0.866, with 95% confidence level, the selected plan was better than 86.6%±5% plans in the search space. For query 17, with relative performance factor 0.812, the selected plan for query 7 was better than more plans in its search space than that of query 17. However, the absolute performance factor of query 7 is 0.815, whereas it's 0.81 for query 17, indicating that the difference between selected plan and the optimal plan in their search space are almost the same, which can indicate that, even though there are more plans that are better than the optimizer chosen plan of query 17, the selected plans are close in absolute performance. For System Y, while the optimality frequency (0.45) shows that in more than half of the queries the optimizer-chosen plan was not the best, in 87% of the queries the chosen plan was better than 80% of the plans in the sample, indicating that, while it may not be the best plan, it is one of the top plans, which may be a good enough plan for an query optimizer with limited resources and limited time.

As with System X, for the queries with performance factor less than 1, the plans that perform better than the selected plan can be analyzed to evaluate the quality of the cost model and plan enumeration approach. For query 17, which has the lowest relative performance factor, among 72 plans that did better than the selected plan, 50 plans were considered and 22 plans were not considered by the query optimizer. Accordingly, the cost model failed to accurately estimate the cost of 70% of the better plans, while the enumeration approach did not consider 30% of the better plans. For query 61, which has the second-lowest relative performance factor, among the 69 plans that did better than the selected plan, 45 (65%) plans were not costed accurately and were erroneously eliminated, and 24 (35%) plans were not even enumerated by the query optimizer. The optimizer costed 735 physical plans for query 17 and 1005 physical plans for query 61, and thus was more efficient for query 17.

FIG. 8 also includes the relative and absolute performance factor of each query for MySQL. The optimality frequency of MySQL is 0.25. That is, the optimizer of MySQL chose the relative optimal plan in no more than 25% of the queries. The average relative performance factor for the queries that do not find the relative optimal plan is 0.82. Furthermore, with 95% confidence, MySQL finds a plan that is better than 80% of the generated sample plans (RPF±5%>80%) for 58% of the queries.

For MySQL, at most 25% of the queries used the best plan and there are still more than half (58%) of the queries for which the optimizer-chosen plan is better than 80% of the sample plans. This indicates again, that while the chosen plan by the optimizer of MySQL was not the best in the majority of the cases, in more than half of the cases the chosen plan was one of the top plans. For query 73, with relative performance factor 0.91, the absolute performance factor is 0.82. For query 40, with relative performance factor 0.809, the absolute performance factor is 0.731. These results indicate the selected plan for query 73 is better than more plans in its search space than that for query 40, and also that the selected plan for query 73 is much closer to its optimal plan than that of query 40.

As with Systems X and Y, for the queries with performance factor less than 1, the plans that perform better than the selected plan can be analyzed to evaluate the quality of the cost model and plan enumeration approach. For query 17, which has the lowest relative performance factor, among 110 plans in the sample that did better than the optimizer-chosen plan, 89 plans were considered, and 21 plans were not considered by the query optimizer. Accordingly, the cost model failed to accurately estimate the cost of 81% of the better plans, while the enumeration quality was relatively high as the optimizer failed to consider only 19% of the better plans. For query 85, among 95 plans in the sample that did better than the optimizer-chosen plan, 78 plans were considered, and 17 plans were not considered by the query optimizer. Accordingly, the cost model failed to accurately estimate the cost of 82% of the better plans, while the enumeration approach failed to consider only 18% of the plans. For both queries, this shows that most of the loss of better plans is because of the inaccuracy of the cost model. This result is to be expected, as plan enumeration in MySQL is relatively straightforward since it only needs to consider join orderings but not physical join operations. As for the efficiency of the optimizer, there are 235 physical plans costed by the optimizer for query 25 and 176 physical plan costed by the optimizer for query 85. Therefore, the optimizer is more efficient for query 85. These results show that the query optimizer for MySQL could be significantly improved by improving the accuracy of the cost model up to the level of the cost models used by the query optimizers in Systems X and Y.

Figures 9, 10:
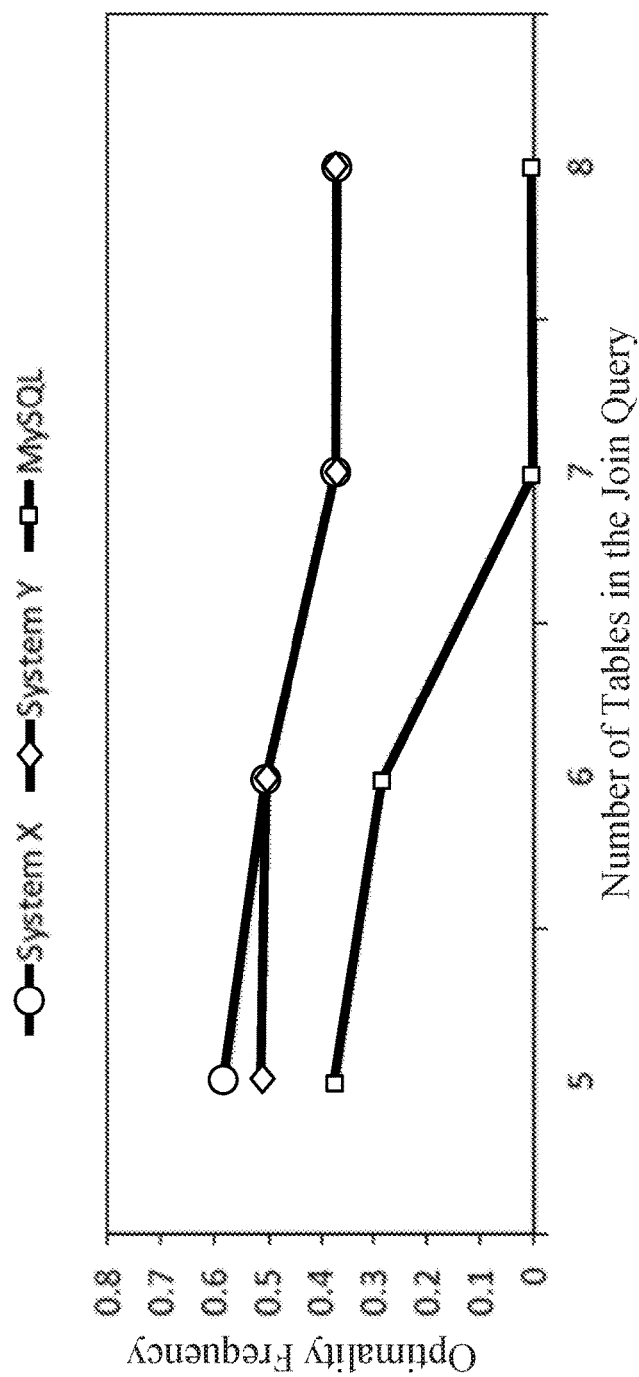
FIG. 9 shows an example of relationships between optimality frequency and the number of tables in the join queries being used to evaluate the query optimizer for three database management systems in accordance with some embodiments of the disclosed subject matter.
FIG. 10 shows examples of the average efficiency for four database management systems using various efficiency metrics in accordance with some embodiments of the disclosed subject matter.

FIG. 9 shows an example of relationships between optimality frequency and the number of tables in the join queries being used to evaluate the query optimizer for three database management systems in accordance with some embodiments of the disclosed subject matter. As shown in FIG. 9, as the number of tables involved in a join query increases, the query optimizer has less success identifying the best execution plans. This performance regression is to be expected, as the errors (e.g., cardinality estimation error) the query optimizer makes during optimization would accumulate as it needs to estimate join cardinalities for multiple levels of joins. The higher the join level is, the harder it is for the optimizer to choose a good plan.

FIG. 10 shows examples of the average efficiency for four database management systems using various efficiency metrics in accordance with some embodiments of the disclosed subject matter. These metrics can be reliably used to compare the efficiency of different versions of an optimizer for the same database management system. For example, if a new enumeration strategy is implemented, these metrics can be used to determine if the new strategy makes the optimizer more efficient, while the RPF and APF can be compared to determine how effective the new version is as compared to the previous version. However, comparisons between different optimizers that might support different operations, table access methods, etc., may be less useful for determining the relative efficiency of query optimizers for different database management systems. For example, comparison of the efficiency metrics of MySQL with other optimizers that support more physical joins operators than just nested loop join may not be useful in determining the relative efficiency of the various query optimizers.

The values in the table of FIG. 10 were calculated by taking the average value over all queries in the profiling set that was evaluated. Some efficiency indicators are not applicable for some systems because the information used to calculate them is not made available by the database management system. From these results, MySQL has the least number of physical plans and physical join plans, and appears to be most efficient. However, this may be mainly due to the fact that MySQL resolves all joins to nested-loop join, and thus its search space is much smaller than the other systems. While the effectiveness of PostgreSQL was not evaluated due to the lack of support for query hints, its efficiency was evaluated as it makes available information for determining the number of physical plans and physical join plans that were considered.

Figure 11:
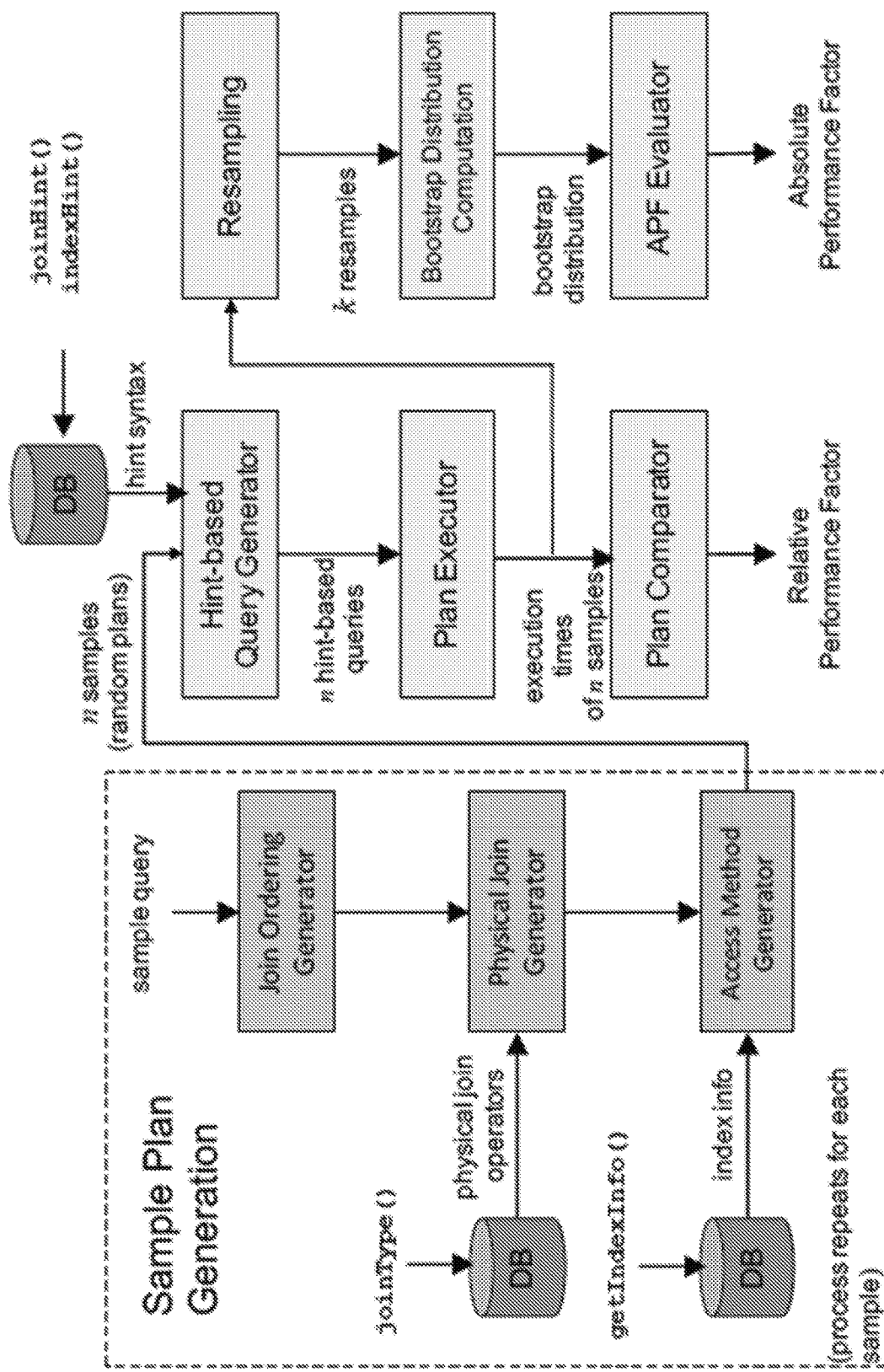
FIG. 11 shows an example of an information flow diagram for calculating performance metrics in accordance with some embodiments of the disclosed subject matter.

FIG. 11 shows an example of an information flow diagram for calculating performance metrics in accordance with some embodiments of the disclosed subject matter. As shown in FIG. 11, the evaluation system 132 can receive a sample query, make various calls to the database management system and/or the API associated with the database management system requesting information, receive information from the database management system and/or the API associated with the database management system, use the information to generate a set of random plans, and cause the random plans to be executed by the database management system to generate execution times that can be used to evaluate the plan generated by the query optimizer based on the sample query.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 3 and 5 can be executed or performed in any suitable order or sequence not limited to the order and sequence shown and described in the figures. Also, some of the above steps of the processes of FIGS. 3 and 5 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for improving t effectiveness of a query optimizer of a database management system, comprising:
at least one hardware processor; and memory storing instructions that, when executed, cause the at least one hardware processor to:

submit a first database query to the database management system;

receive information indicative of an amount of time taken by the database management system to execute the first database query using a plan selected by the query optimizer, wherein the query optimizer is from a plurality of query optimizers suitable for executing the first database query, each of the plurality of query optimizers is associated with a different database management system;

cause the database management system to execute each of a plurality of test plans that the database management system is capable of using to execute the first database query, wherein the plurality of test plans includes at least one plan not generated by the query optimizer;

receive information indicative of an amount of time taken by the database management system to execute the first database query using each of the plurality of test plans;

determine, based on the amount of time taken to execute the first database query using the plan selected by the query optimizer and the amount of time taken to execute the first database query using each test plan, a metric indicative of the effectiveness of the query optimizer, wherein the effectiveness indicates a quality of plans that the optimizer selects;

cause the metric indicative of the effectiveness of the query optimizer to be presented to a user; and allow the user, based on the presented metric, to make changes to the query optimizer to improve the determined effectiveness.

2. The system of claim 1, wherein the memory stores a plurality of database queries, including the first database query, and the instructions further cause the at least one hardware processor to:

submit each of the plurality of database queries to the database management system;

receive, for each of the plurality of database queries, information indicative of an amount of time taken by the database management system to execute the database query using a plan selected by the query optimizer;

cause, for each of the plurality of database queries, the database management system to execute each of a plurality of test plans that the database management system is capable of using to execute the database query;

receive, for each of the plurality of database queries, information indicative of an amount of time taken by the database management system to execute the database query using each of the plurality of test plans associated with the database query;

determine, for each of the plurality of database queries, a proportion of the test plans associated with execution times longer than the amount of time taken to execute the database query using the plan selected by the query optimizer; and calculate the metric based on the proportion of the test plans associated with execution times longer than the amount of time taken to execute the database query using the plan selected by the query optimizer associated with each of the plurality of database queries.

3. The system of claim 2, wherein the metric is based on the number of database queries of the plurality of database queries for which the plan selected by the query optimizer is associated with a longer execution time than each of the plurality of test plans.

4. The system of claim 1, wherein the instructions further cause the at least one hardware processor to:

generate n test plans that each causes the database management system to execute the first database query, wherein each of the plurality of test plans is one of the n test plans;

determine that n is not large enough to produce a reliable estimate of the metric based on a value of n and a proportion of the plurality of test plans associated with execution times longer than the amount of time taken to execute the first database query using the plan selected by the query optimizer;

calculate a number of test plans n' to be generated to reliably estimate the metric, wherein n'>n; and generate additional test plans that each causes the database management system to execute the first database query until n' test plans have been generated.

5. The system of claim 4, wherein the instructions further cause the at least one hardware processor to:

determine that at least one of the following conditions does not hold:

$$n \times p \geq 5; \text{ and}$$

$$n \times (1-p) \geq 5,$$

where p is the proportion of the plurality of test plans associated with execution times longer than the amount of time taken to execute the first database query using the plan selected by the query optimizer; and in response to determining that the at least one of the conditions does not hold, determine that n is not large enough to produce a reliable estimate of the metric.

6. The system of claim 4, wherein the instructions further cause the at least one hardware processor to:

identify a plurality of tables associated with the first database query;

randomly select a join order for the plurality of tables; and generate a first test plan of the plurality of test plans based on the join order.

7. The system of claim 1, wherein the instructions further cause the at least one hardware processor to:

identify a first test plan of the plurality of test plans that caused the database management system to execute the first database query in a least amount of time;

in response to identifying the first test plan, compare the amount of time taken to execute the plan selected by the query optimizer to the amount of time taken to execute the first test plan; and calculate, based on the comparison of the amount of time taken to execute the plan selected by the query optimizer to the amount of time taken to execute the first test plan, a second metric indicative of the effectiveness of the query optimizer.

8. The system of claim 1, wherein the instructions further cause the at least one hardware processor to:

request, from an application program interface (API) associated with the database management system, the information indicative of the amount of time taken by the database management system to execute the first database query using the plan selected by the query optimizer; and receive, from the API, the information indicative of the amount of time taken by the database management system to execute the first database query using the plan selected by the query optimizer.

9. The system of claim 8, wherein the instructions further cause the at least one hardware processor to request, from the API, indicative of an amount of time taken by the database management system to execute the first database query using each of the plurality of test plans.

10. The system of claim 8, wherein the instructions further cause the at least one hardware processor to:
receive, in response to a request submitted to the API, syntax to cause the database management system to execute the first test plan; and
cause the database management system to execute the first test plan using the syntax received from the API.

11. A method for improving the effectiveness of a query optimizer of a database management system, comprising:
submitting a first database query to the database management system;
receiving information indicative of an amount of time taken by the database management system to execute the first database query using a plan selected by the query optimizer, wherein the query optimizer is from a plurality of query optimizers suitable for executing the first database query, each of the plurality of query optimizers is associated with a different database management system;
causing the database management system to execute each of a plurality of test plans that the database management system is capable of using to execute the first database query, wherein the plurality of test plans includes at least one plan not generated by the query optimizer;
receiving information indicative of an amount of time taken by the database management system to execute the first database query using each of the plurality of test plans;
determining, based on the amount of time taken to execute the first database query using the plan selected by the query optimizer and the amount of time taken to execute the first database query using each test plan, a metric indicative of the effectiveness of the query optimizer, wherein the effectiveness indicates a quality of plans that the optimizer selects;
causing the metric indicative of the effectiveness of the query optimizer to be presented to a user; and
allowing the user, based on the presented metric, to make changes to the query optimizer to improve the determined effectiveness.

12. The method of claim 11, further comprising:
submitting each of a plurality of database queries to the database management system;
receiving, for each of the plurality of database queries, information indicative of an amount of time taken by the database management system to execute the database query using a plan selected by the query optimizer;
causing, for each of the plurality of database queries, the database management system to execute each of a plurality of test plans that the database management system is capable of using to execute the database query;
receiving, for each of the plurality of database queries, information indicative of an amount of time taken by the database management system to execute the database query using each of the plurality of test plans associated with the database query;
determining, for each of the plurality of database queries, a proportion of the test plans associated with execution times longer than the amount of time taken to execute the database query using the plan selected by the query optimizer; and
calculating the metric based on the proportion of the test plans associated with execution times longer than the amount of time taken to execute the database query using the plan selected by the query optimizer associated with each of the plurality of database queries.

13. The method of claim 12, wherein the metric is based on the number of database queries of the plurality of database queries for which the plan selected by the query optimizer is associated with a longer execution time than each of the plurality of test plans.

14. The method of claim 11, further comprising:
generating n test plans that each causes the database management system to execute the first database query, wherein each of the plurality of test plans is one of the n test plans;
determining that n is not large enough to produce a reliable estimate of the metric based on a value of n and a proportion of the plurality of test plans associated with execution times longer than the amount of time taken to execute the first database query using the plan selected by the query optimizer;
calculating a number of test plans n' to be generated to reliably estimate the metric, wherein n'>n; and
generating additional test plans that each causes the database management system to execute the first database query until n' test plans have been generated.

15. The method of claim 14, further comprising:
determining that at least one of the following conditions does not hold:

$n \times p \geq 5$; and $n \times (1-p) \geq 5$, where p is the proportion of the plurality of test plans associated with execution times longer than the amount of time taken to execute the first database query using the plan selected by the query optimizer; and
in response to determining that the at least one of the conditions does not hold, determining that n is not large enough to produce a reliable estimate of the metric.

16. The method of claim 14, further comprising:
identifying a plurality of tables associated with the first database query;
randomly selecting a join order for the plurality of tables; and
generating a first test plan of the plurality of test plans based on the join order.

17. The method of claim 11, further comprising:
identifying a first test plan of the plurality of test plans that caused the database management system to execute the first database query in a least amount of time;
in response to identifying the first test plan, comparing the amount of time taken to execute the plan selected by the query optimizer to the amount of time taken to execute the first test plan; and
calculating, based on the comparison of the amount of time taken to execute the plan selected by the query optimizer to the amount of time taken to execute the first test plan, a second metric indicative of the effectiveness of the query optimizer.

18. The method of claim 11, further comprising:
requesting, from an application program interface (API) associated with the database management system, the information indicative of the amount of time taken by the database management system to execute the first database query using the plan selected by the query optimizer; and
receiving, from the API, the information indicative of the amount of time taken by the database management system to execute the first database query using the plan selected by the query optimizer.

19. The method of claim 18, further comprising requesting, from the API, indicative of an amount of time taken by the database management system to execute the first database query using each of the plurality of test plans.

20. The method of claim 18, further comprising:
receiving, in response to a request submitted to the API, syntax to cause the database management system to execute the first test plan; and
causing the database management system to execute the first test plan using the syntax received from the API.

21. A non-transitory computer readable medium containing computer executable instructions that, when executed by a processor, cause the processor to perform a method for improving the effectiveness of a query optimizer of a database management system, the method comprising:
submitting a first database query to the database management system;
receiving information indicative of an amount of time taken by the database management system to execute the first database query using a plan selected by the query optimizer, wherein the query optimizer is from a plurality of query optimizers suitable for executing the first database query, each of the plurality of query optimizers is associated with a different database management system;
causing the database management system to execute each of a plurality of test plans that the database management system is capable of using to execute the first database query, wherein the plurality of test plans includes at least one plan not generated by the query optimizer;
receiving information indicative of an amount of time taken by the database management system to execute the first database query using each of the plurality of test plans;
determining, based on the amount of time taken to execute the first database query using the plan selected by the query optimizer and the amount of time taken to execute the first database query using each test plan, a metric indicative of the effectiveness of the query optimizer, wherein the effectiveness indicates a quality of plans that the optimizer selects;
causing the metric indicative of the effectiveness of the query optimizer to be presented to a user; and
allowing the user, based on the presented metric, to make changes to the query optimizer to improve the determined effectiveness.

* * * * *

UNITED STATES PATENT AND TRADEMARK OFFICE
CERTIFICATE OF CORRECTION

PATENT NO. : 11,327,967 B2
APPLICATION NO. : 16/617245
DATED : May 10, 2022
INVENTOR(S) : Olga Papaemmanouil et al.

It is certified that error appears in the above-identified patent and that said Letters Patent is hereby corrected as shown below:

In the Claims

Claim 1, Column 28, Line 63, "improving t effectiveness" should be --improving the effectiveness--.

Signed and Sealed this
Ninth Day of August, 2022

Katherine Kelly Vidal
*Director of the United States Patent and Trademark Office*